US012075473B2

(12) United States Patent
Sarkis et al.

(10) Patent No.: US 12,075,473 B2
(45) Date of Patent: Aug. 27, 2024

(54) TECHNIQUES FOR CHANNEL SENSING MODE SELECTION

(71) Applicant: QUALCOMM Incorporated, San Diego, CA (US)

(72) Inventors: Gabi Sarkis, San Diego, CA (US); Sourjya Dutta, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 17/451,730

(22) Filed: Oct. 21, 2021

(65) Prior Publication Data

US 2022/0132568 A1 Apr. 28, 2022

Related U.S. Application Data

(60) Provisional application No. 63/104,860, filed on Oct. 23, 2020.

(51) Int. Cl.
*H04W 74/0808* (2024.01)
*H04L 47/32* (2022.01)

(52) U.S. Cl.
CPC ......... *H04W 74/0808* (2013.01); *H04L 47/32* (2013.01)

(58) Field of Classification Search
CPC ............................ H04W 74/0808; H04L 47/32
See application file for complete search history.

(56) References Cited

U.S. PATENT DOCUMENTS

2018/0359659 A1* 12/2018 Cai .................. H04W 72/02
2020/0229171 A1* 7/2020 Khoryaev ............ H04W 4/40

OTHER PUBLICATIONS

Intel Corporation: "Sidelink Resource Allocation Design for NR V2X Communication", 3GPP TSG RAN WG1 Meeting #96bis, 3GPP Draft, R1-1904296 Intel—EV2X_SL_M2, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 3, 2019 (Apr. 3, 2019), 15 Pages, XP051707175, Retrieved from the Internet: URL: http://www.3gpp.org/ftp/tsg%5Fran/WG1%5FRL1/TSGR1%5F96b/Docs/R1%2D1984296%2Ezip [Retrieved on Apr. 3, 2019] paragraphs [02.6] - [02.8].

(Continued)

*Primary Examiner* — Siming Liu
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may identify a channel sensing mode, from one or more channel sensing modes for sensing channel availability of a sidelink channel, for a communication on the sidelink channel, each of the one or more channel sensing modes associated with a set of resources. The UE may transmit, using resources selected from the set of resources associated with the channel sensing mode, the communication on the sidelink channel in accordance with the channel sensing mode. Numerous other aspects are provided.

30 Claims, 11 Drawing Sheets

(56) References Cited

OTHER PUBLICATIONS

Intel Corporation: "Summary#4 for AI 7.2.4.2.2 Mode-2 Resource Allocation", 3GPP Draft, 3GPP TSG RAN WG1 Meeting #98, R1-1909892—SUMMARY#4 of 5G V2X Mode 2 V1, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 25, 2019-Aug. 30, 2019, Sep. 3, 2019 (Sep. 3, 2019), XP051766483, 34 pages, Retrieved from the Internet: URL: http://www.3gpp.org/ftp/tsg_ran/WG1_RL1/TSGR1_98/Docs/R1-1909892.zip [retrieved on Sep. 3, 2019] . paragraph [0002], p. 26, p. 29, Section 4.
International Search Report and Written Opinion—PCT/US2021/056281—ISA/EPO—Feb. 28, 2022.

\* cited by examiner

TECHNIQUES FOR CHANNEL SENSING MODE SELECTION

CROSS-REFERENCE TO RELATED APPLICATION

This patent application claims priority to U.S. Provisional Patent Application No. 63/104,860, filed on Oct. 23, 2020, entitled "TECHNIQUES FOR CHANNEL SENSING MODE SELECTION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for channel sensing mode selection.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes identifying a channel sensing mode, from one or more channel sensing modes for sensing channel availability of a sidelink channel, for a communication on the sidelink channel, each of the one or more channel sensing modes associated with a set of resources; and transmitting, using resources selected from the set of resources associated with the channel sensing mode, the communication on the sidelink channel in accordance with the channel sensing mode.

In some aspects, a method of wireless communication performed by a transmitter includes transmitting, to a UE, an indication of one or more channel sensing modes to be used by the UE for sensing channel availability of a sidelink channel; and transmitting, to the UE, an indication of information to be used by the UE for a determination of a channel sensing mode, of the one or more channel sensing modes, to be used by the UE for resource selection for a communication on the sidelink channel.

In some aspects, a UE for wireless communication includes a memory and one or more processors coupled to the memory. The one or more processors may be configured to: identify a channel sensing mode, from one or more channel sensing modes for sensing channel availability of a sidelink channel, for a communication on the sidelink channel, each of the one or more channel sensing modes associated with a set of resources; and transmit, using resources selected from the set of resources associated with the channel sensing mode, the communication on the sidelink channel.

In some aspects, a transmitter for wireless communication includes a memory and one or more processors coupled to the memory. The one or more processors may be configured to: transmit, to a UE, an indication of one or more channel sensing modes to be used by the UE for sensing channel availability of a sidelink channel; and transmit, to the UE, an indication of information to be used by the UE for a determination of a channel sensing mode, of the one or more channel sensing modes, to be used by the UE for resource selection for a communication on the sidelink channel.

In some aspects, a non-transitory computer-readable medium storing a set of instructions for wireless communication includes one or more instructions that, when executed by one or more processors of a UE, cause the UE to: identify a channel sensing mode, from one or more channel sensing modes for sensing channel availability of a sidelink channel, for a communication on the sidelink channel, each of the one or more channel sensing modes associated with a set of resources; and transmit, using resources selected from the set of resources associated with the channel sensing mode, the communication on the sidelink channel in accordance with the channel sensing mode.

In some aspects, a non-transitory computer-readable medium storing a set of instructions for wireless communication includes one or more instructions that, when executed by one or more processors of a transmitter, cause the transmitter to: transmit, to a UE, an indication of one or more channel sensing modes to be used by the UE for sensing channel availability of a sidelink channel; and transmit, to the UE, an indication of information to be used by the UE for a determination of a channel sensing mode, of the one or more channel sensing modes, to be used by the UE for resource selection for a communication on the sidelink channel.

In some aspects, an apparatus for wireless communication includes means for identifying a channel sensing mode, from one or more channel sensing modes for sensing channel availability of a sidelink channel, for a communication on the sidelink channel, each of the one or more channel sensing modes associated with a set of resources; and means for transmitting, using resources selected from the set of resources associated with the channel sensing mode.

In some aspects, an apparatus for wireless communication includes means for transmitting, to a UE, an indication of one or more channel sensing modes to be used by the UE for sensing channel availability of a sidelink channel; and means for transmitting, to the UE, an indication of information to be used by the UE for a determination of a channel sensing mode, of the one or more channel sensing modes, to be used by the UE for resource selection for a communication on the sidelink channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
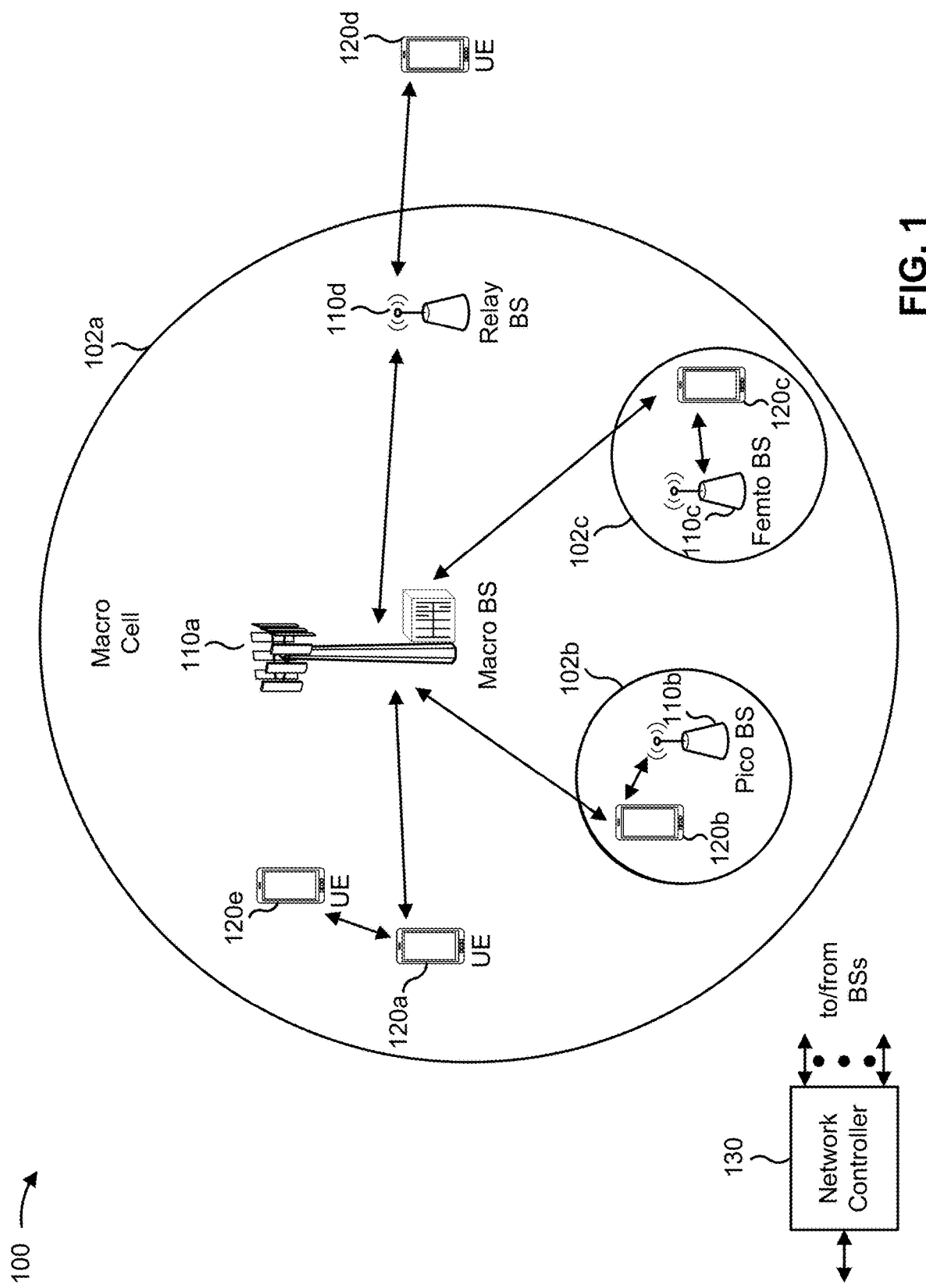
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band.

Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
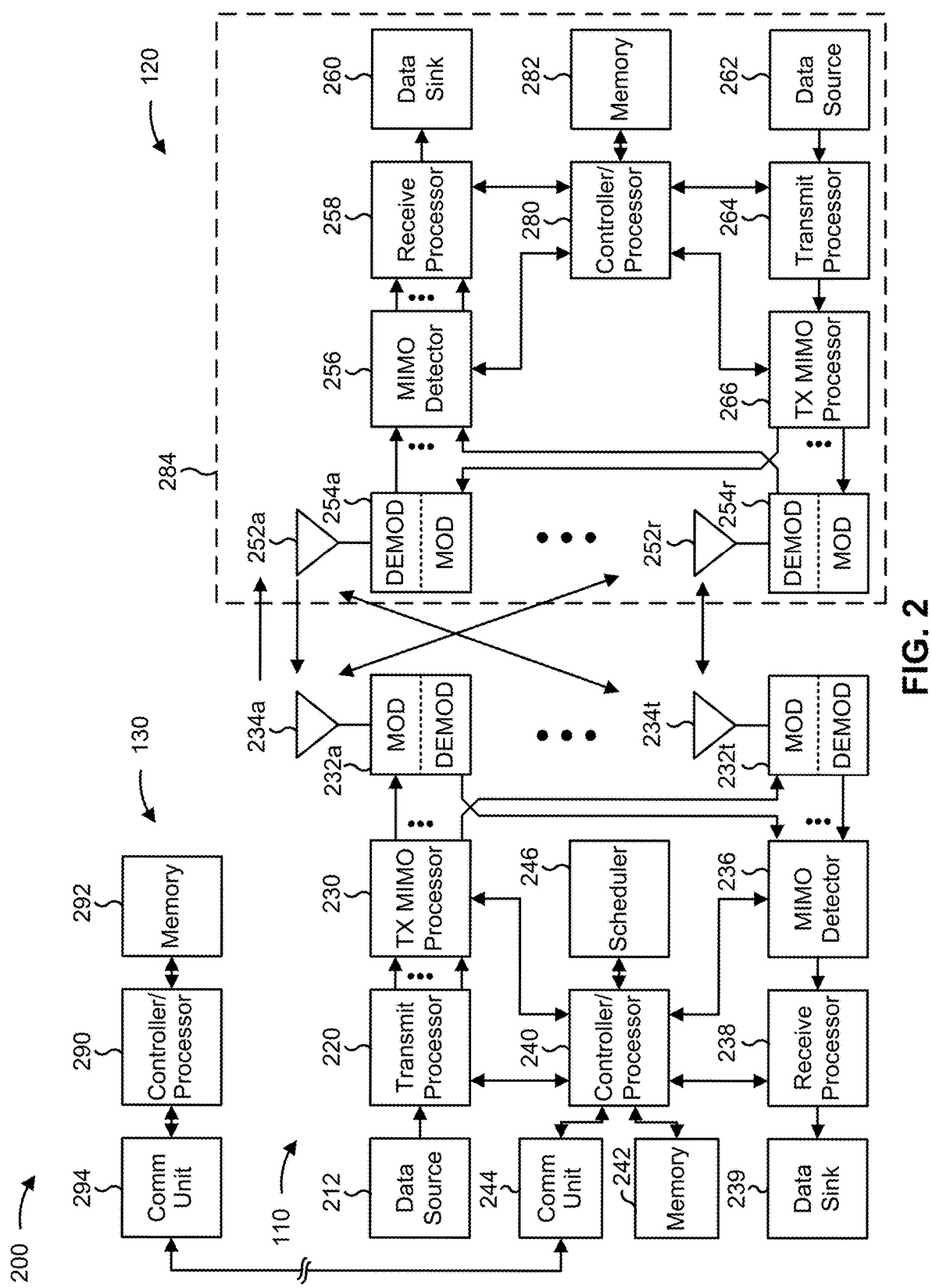
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with channel sensing mode selection, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions.

In some aspects, the UE 120 includes means for identifying a channel sensing mode, from one or more channel sensing modes for sensing channel availability of a sidelink channel, for a communication on the sidelink channel, each of the one or more channel sensing modes associated with a set of resources; and/or means for transmitting, using resources selected from the set of resources associated with the channel sensing mode, the communication on the sidelink channel in accordance with the channel sensing mode. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for selecting resources associated with the sidelink channel for the communication in accordance with the channel sensing mode; and/or means for transmitting, using the resources, the communication on the sidelink channel.

In some aspects, the UE 120 includes means for determining a value of one or more parameters related to a quality of service (QoS) associated with the communication; and/or means for identifying the channel sensing mode, from the one or more channel sensing modes, based at least in part on the value of the one or more parameters.

In some aspects, the UE 120 includes means for determining a transmission priority level associated with the communication; means for determining whether the transmission priority level satisfies a threshold; and/or means for identifying the channel sensing mode, from the one or more channel sensing modes, based at least in part on the determination of whether the transmission priority level satisfies the threshold. In some aspects, the UE 120 includes means for obtaining, from a configuration, an indication of the threshold, where the threshold is a predefined threshold. In some aspects, the UE 120 includes means for determining the threshold based at least in part on a configuration transmitted to the UE.

In some aspects, the UE 120 includes means for determining a packet delay budget value associated with the communication; means for determining whether the packet delay budget value satisfies a threshold; and/or means for identifying the channel sensing mode, from the one or more channel sensing modes, based at least in part on the determination of whether the packet delay budget value satisfies the threshold. In some aspects, the UE 120 includes means for obtaining, from a configuration, an indication of the threshold, where the threshold is a predefined threshold. In some aspects, the UE 120 includes means for determining the threshold based at least in part on a configuration transmitted to the UE. In some aspects, the UE 120 includes means for determining a size of a channel sensing window associated with at least one of the one or more channel sensing modes; and/or means for determining the threshold based at least in part on the size of the channel sensing window.

In some aspects, the UE 120 includes means for determining a remaining packet delay budget value associated with the communication; means for determining whether the remaining packet delay budget value satisfies a threshold; and/or means for identifying the channel sensing mode, from the one or more channel sensing modes, based at least in part on the determination of whether the remaining packet delay budget value satisfies the threshold. In some aspects, the UE 120 includes means for obtaining, from a configuration, an indication of the threshold, where the threshold is a predefined threshold. In some aspects, the UE 120 includes means for determining the threshold based at least in part on a configuration transmitted to the UE. In some aspects, the UE 120 includes means for determining a size of a channel sensing window associated with at least one of the one or more channel sensing modes; and/or means for determining the threshold based at least in part on the size of the channel sensing window.

In some aspects, the UE 120 includes means for receiving, from a transmitter, an indication of the channel sensing mode to be used by the UE; and/or means for identifying the channel sensing mode, from the one or more channel sensing modes, based at least in part on the indication of the channel sensing mode to be used by the UE.

In some aspects, the UE 120 includes means for identifying the channel sensing mode, from the one or more channel sensing modes, based at least in part on a configuration transmitted to the UE.

In some aspects, the UE 120 includes means for determining a value associated with one or more power constraint parameters; and/or means for identifying the channel sensing mode, from the one or more channel sensing modes, based at least in part on the value associated with the one or more power constraint parameters.

In some aspects, the UE 120 includes means for determining whether the UE is enabled to change the channel sensing mode associated with the UE based at least in part on a configuration transmitted to the UE.

In some aspects, the UE 120 includes means for determining one or more permitted channel sensing modes from the one or more channel sensing modes; and/or means for identifying the channel sensing mode, from the one or more permitted channel sensing modes, based at least in part on the determination of the one or more permitted channel sensing modes. In some aspects, the UE 120 includes means for receiving, from a transmitter, an indication of the one or more permitted channel sensing modes.

In some aspects, a transmitter device (e.g., a base station 110, a wireless node, a roadside unit, and/or a UE 120, among other examples) includes means for transmitting, to a UE, an indication of one or more channel sensing modes to be used by the UE for sensing channel availability of a sidelink channel; and/or means for transmitting, to the UE, an indication of information to be used by the UE for a determination of a channel sensing mode, of the one or more channel sensing modes, to be used by the UE for resource selection for a communication on the sidelink channel. The means for the transmitter device to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the means for the transmitter device to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the transmitter device includes means for determining a channel sensing mode, from the one or more channel sensing modes, to be used by the UE.

In some aspects, the transmitter device includes means for determining one or more QoS parameter thresholds to be used by the UE for the determination of the channel sensing mode.

In some aspects, the transmitter device includes means for determining whether the UE is to be enabled to change the channel sensing mode of the UE; and/or In some aspects, the transmitter device includes means for determining one or more permitted channel sensing modes, from the one or more channel sensing modes, to be used by the UE. In some aspects, the transmitter device includes means for transmitting, to the UE, an indication of the channel sensing mode to be used by the UE.

In some aspects, the transmitter device includes means for transmitting, to the UE, an indication of one or more QoS parameter thresholds to be used by the UE for the determination of the channel sensing mode. In some aspects, the transmitter device includes means for transmitting, to the UE, an indication of whether the UE is to be enabled to change the channel sensing mode of the UE.

As indicated above, FIG. 2 is provided as an example. Other examples may differ from what is described with regard to FIG. 2.

Figure 3:
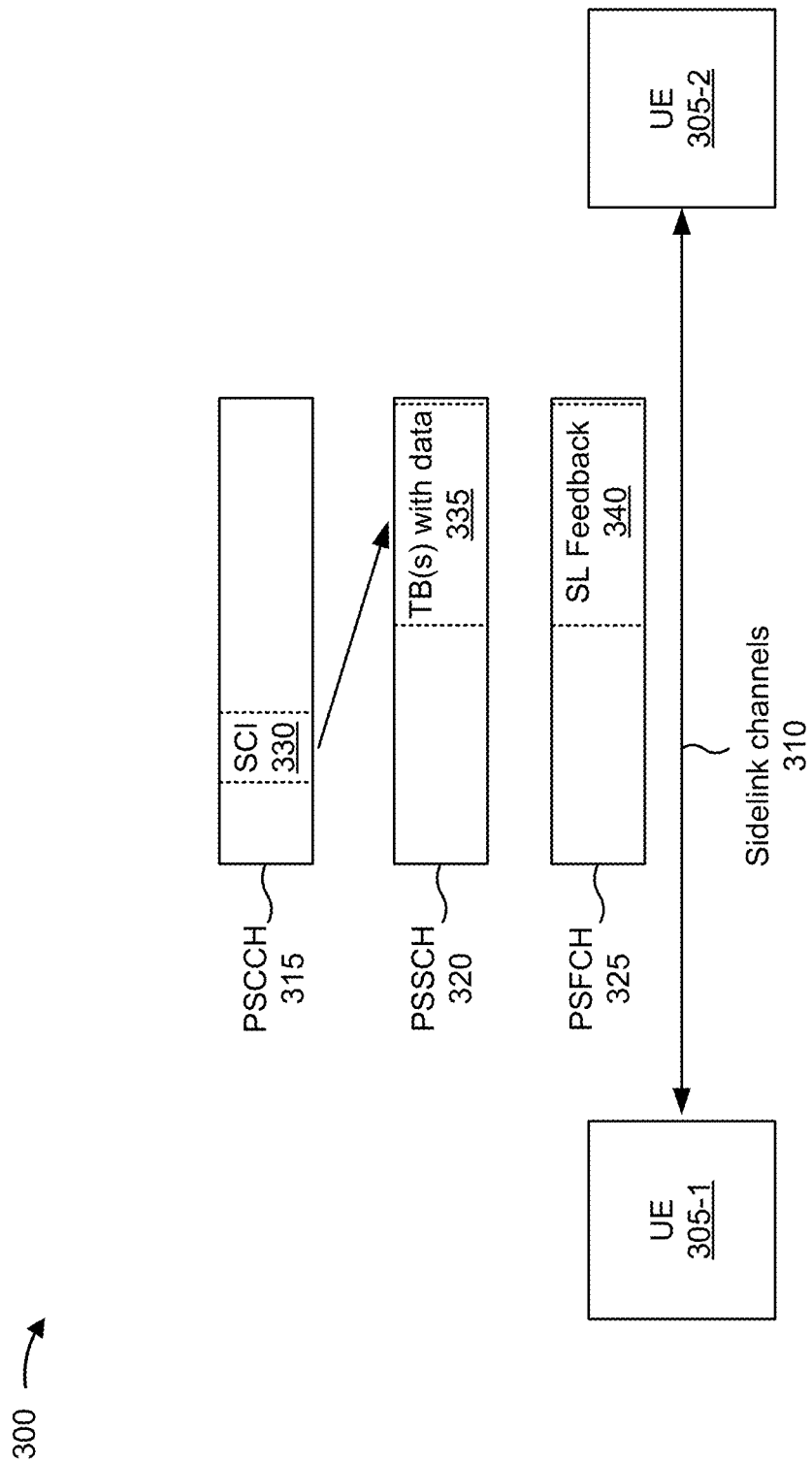
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle to pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for one or more subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
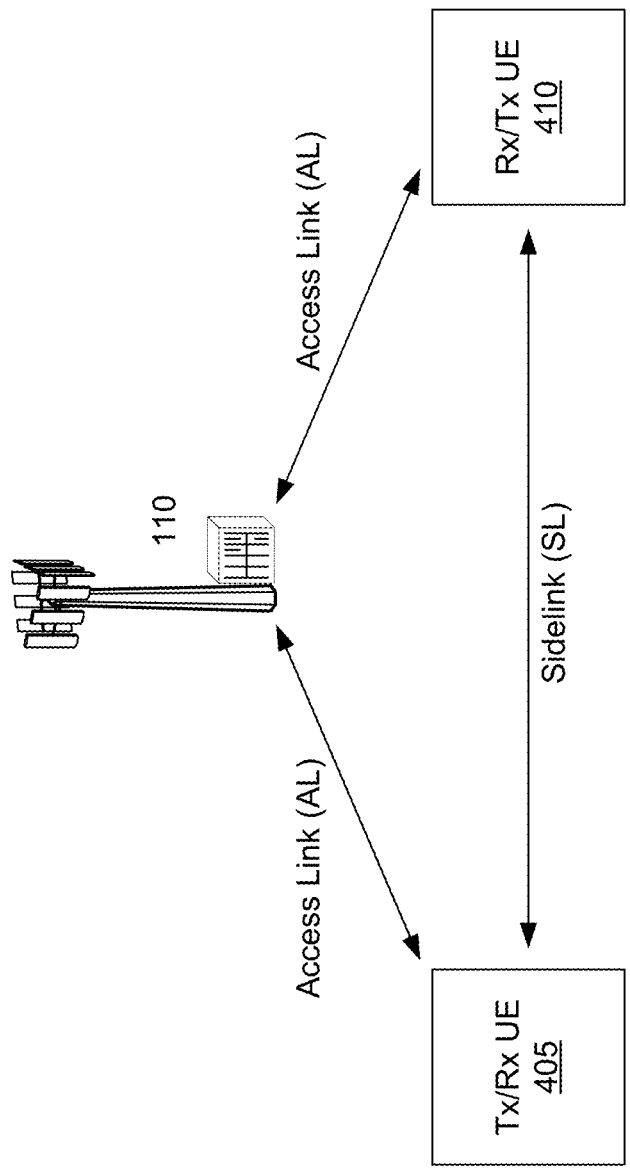
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
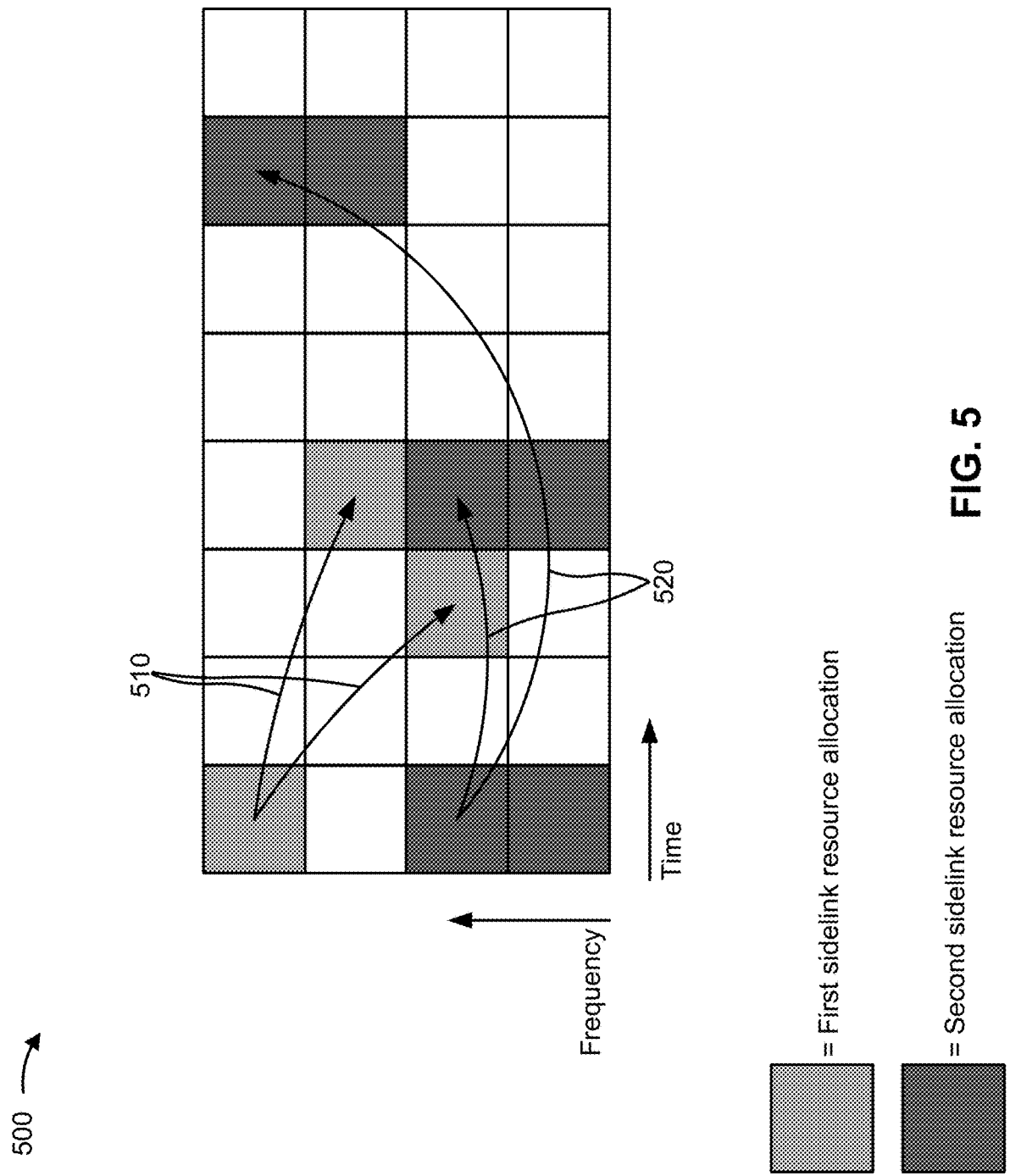
FIG. 5 is a diagram illustrating an example of resource allocation for sidelink communications, in accordance with the present disclosure.

FIG. 5 is a diagram illustrating an example 500 of resource allocation for sidelink communications, in accordance with the present disclosure. As shown in FIG. 5, sidelink communications may take place using resource pools. Resource pools may be defined for sidelink transmission and sidelink reception. A resource pool may include one or more sub-channels in the frequency domain and one or more slots in the time domain. For example, the minimum resource allocation in the frequency domain may be a sub-channel, and the minimum resource allocation in the time domain may be a slot. In some aspects, one or more slots of a resource pool may be unavailable for sidelink communications. In some aspects, one or more resource pools may be configured (or pre-configured) for sidelink communications between UEs 120.

As shown by reference number 510, a first UE 120 may transmit resource reservation information (e.g., a sidelink grant) in SCI in a first sub-channel and a first slot of the resource pool. The sidelink grant may reserve resources in the first slot and up to two other future slots. For example, as shown in FIG. 5, SCI transmitted in the first slot and the first sub-channel may reserve resources for the first UE 120 in a second sub-channel and a fourth slot and in a third sub-channel and a third slot.

As shown by reference number 520, a second UE may transmit resource reservation information (e.g., a sidelink grant) in SCI in the first slot that occupies a plurality of sub-channels. The SCI may reserve a plurality of sub-channels for the second UE 120 in a fourth slot of the resource pool and in a seventh slot of the resource pool.

In some aspects, SCI transmitted by a UE 120 (e.g., the first UE 120 and/or the second UE 120) may reserve aperiodic (e.g., dynamic) resources or periodic resources. For example, the SCI may reserve resources that repeat with a configured periodicity. In some aspects, a periodicity for periodic sidelink resources may have a value between 0 milliseconds and 1000 milliseconds, among other examples. In some aspects, UEs 120 may be enabled and/or prevented from reserving periodic resources on a sidelink channel by a configuration.

As indicated above, FIG. 5 is provided as an example. Other examples may differ from what is described with respect to FIG. 5.

Figure 6:
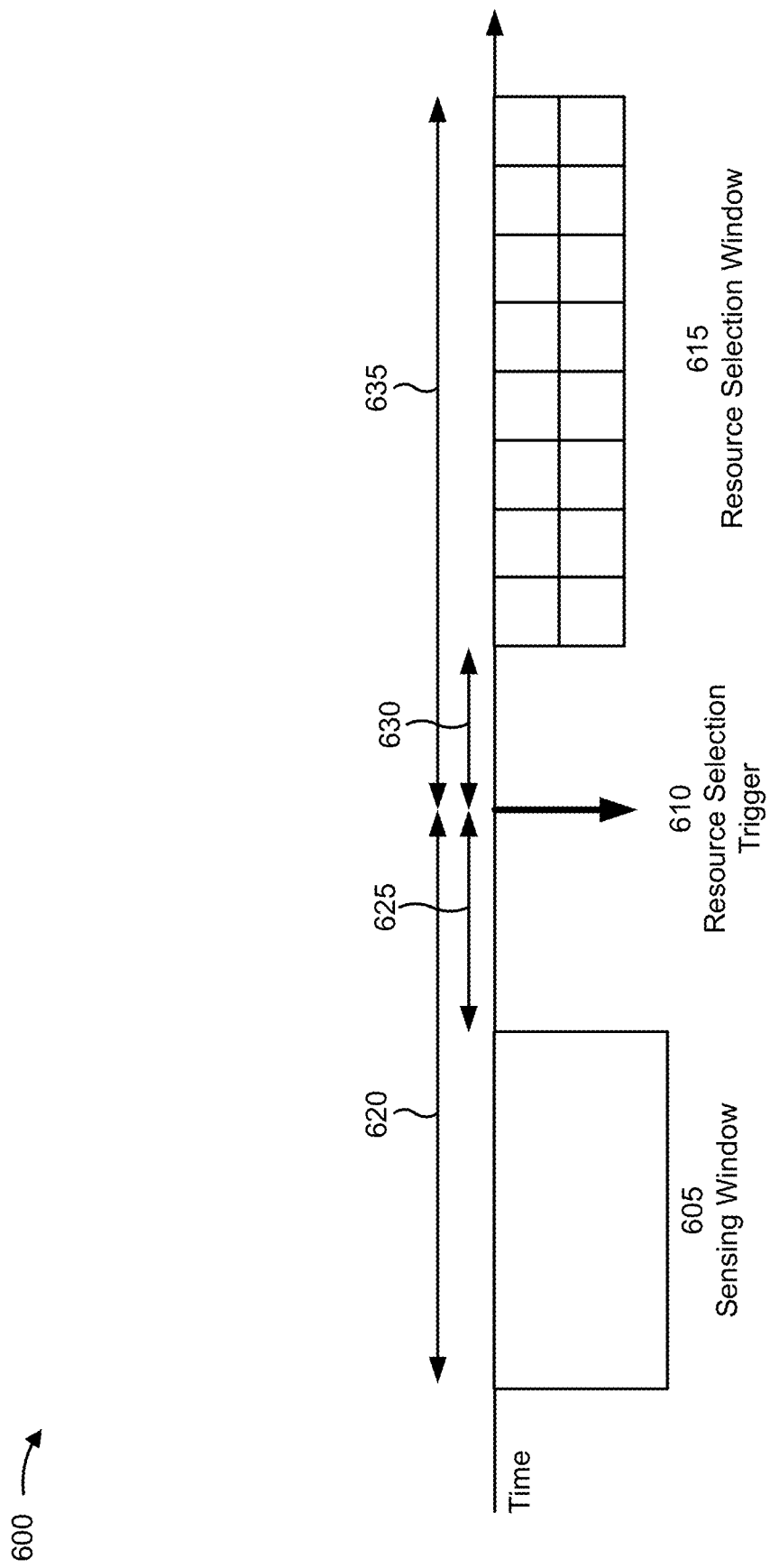
FIG. 6 is a diagram illustrating an example of resource selection for sidelink communications, in accordance with the present disclosure.

FIG. 6 is a diagram illustrating an example 600 of resource selection for sidelink communications, in accordance with the present disclosure. As shown in FIG. 6, a UE 120 may use a channel sensing procedure to select resources for sidelink communication, such as described above in connection with FIG. 3.

As shown in FIG. 6, a UE 120 may perform a channel sensing procedure in a sensing window 605. In some cases, the sensing window may be 100 milliseconds (e.g., for aperiodic resource reservation, such as aperiodic reservation in one or more slots of up to 32 logical slots in the future) or 1100 milliseconds (e.g., for periodic resource reservation). In some cases, a UE 120 configured for communication in an NR network may use a sensing procedure for aperiodic or periodic resource reservation.

According to the channel sensing procedure, the UE 120 may decode control messages relating to resource reservations of other UEs 120, as well as perform measurements (e.g., RSRP measurements and/or RSSI measurements, among other examples) associated with one or more sidelink channels. For example, the other UEs 120 may transmit reservation information (e.g., in SCI) that indicates a resource reservation for a current slot (e.g., the slot in which the reservation information is transmitted) and for one or more (e.g., up to two) future slots (e.g., as described in connection with FIG. 5). The UE 120 may monitor for and decode the reservation information during the sensing window 605 to determine a channel availability (e.g., to determine available resources) of the sidelink channel.

As shown in FIG. 6, the UE 120 may determine to select resources for a sidelink communication based at least in part on a resource selection trigger 610. For example, resource selection may be triggered when the UE 120 has a packet that is to be transmitted or when the UE 120 receives an indication to select (or reselect) resources for a packet that is to be transmitted by the UE 120. Based at least in part on the resource selection trigger 610, the UE 120 may determine one or more resources that are available for selection in a resource selection window 615. That is, the UE 120 may determine the one or more available resources based at least in part on the channel sensing procedure performed by the UE 120. For example, the channel sensing procedure may provide an indication of resources in the resource selection window 615 that are occupied and/or resources in the resource selection window 615 associated with high interference.

The sensing window 605 may be based at least in part on a timing associated with the resource selection trigger 610.

For example, as shown by reference number 620, the sensing window may begin at a time $T_0$ from the resource selection trigger 610. As shown by reference number 625, the sensing window 605 may end at a time $T_{proc,0}$ from the resource selection trigger 610. $T_{proc,0}$ may be based at least in part on a processing time associated with the UE 120. In other words, the UE 120 may continually perform the channel sensing procedure associated with the sidelink channel described above. When the UE 120 is triggered to select resources for a sidelink communication, the UE 120 may consider reservation information and/or measurements associated with the channel sensing procedure that were received and/or performed during the channel sensing window 605.

As shown by reference numbers 630 and 635, if a resource selection trigger 610 occurs at a time n, the resource selection window 615 may be from $n+T_1$ to $n+T_2$. In some aspects, $T_1$ may be less than a processing time ($T_{proc,1}$) associated with the UE 120. In some aspects, $T_2$ may be greater than or equal to $T_{2,min}$, which may be a value configured for the UE based at least in part on a priority of the UE 120, and less than or equal to a remaining packet delay budget (PDB) of the packet to be transmitted by the UE 120.

In some aspects, the UEs 120 may perform resource selection for a sidelink channel in accordance with different channel sensing modes. For example, a first channel sensing mode may be a full channel sensing mode where a channel sensing window occurs before a resource selection trigger in a time domain (e.g., as described above in connection with FIG. 6). In some aspects, a second channel sensing mode may be an on-demand channel sensing mode where a channel sensing window occurs after a resource selection trigger in a time domain. For example, the UE 120 may be triggered to select resources associated with sidelink communication and may perform a channel sensing procedure after receiving the resource selection trigger (e.g., in a sensing window, which may be extended for retransmissions). In some examples, the on-demand channel sensing mode may be a channel sensing mode associated with initiating sensing after a resource selection trigger without a defined window (e.g., where the UE 120 continuously checks whether selected resources are available after selection of the resources). UEs 120 operating in the full channel sensing mode or the on-demand channel sensing mode may be enabled to perform a channel sensing procedure over an entire sidelink bandwidth. As a result, a reliability of sidelink communications transmitted by UEs operating in the full channel sensing mode or the on-demand channel sensing mode may be increased. However, performing the channel sensing procedure may increase a latency associated with communications and/or may computationally intensive and consume significant processing resources of the UE 120.

A third channel sensing mode may be a random selection mode in which the UE 120 does not perform a channel sensing procedure. For example, the UE 120 may not perform a sensing procedure in a sensing window, and may select (e.g., at random) resources in a resource selection window. Accordingly, the UE 120 may determine that all resources in the resource selection window are candidates for selection when using a random selection mode, and the UE 120 may report one or more candidates to higher layers for use. As a result, latency associated with sidelink communications that are performed by using UE 120 operating in a random selection mode may be decreased. However, UEs 120 operating in a random selection mode may experience a high rate of resource collision (e.g., resources reserved by the UE 120 operating in a random selection mode may overlap, in the time domain and/or the frequency domain, with resources reserved by other UEs 120), resulting in a decreased reliability associated with the sidelink communications.

Therefore, in some cases, it may be desirable for a UE 120 to change a channel sensing mode in which the UE 120 is operating for sidelink communications. However, a channel sensing mode of the UE 120 may not be flexible. For example, the channel sensing mode of the UE 120 may be set, or otherwise fixed (such as by a configuration of the UE 120), and the UE 120 may be unable to change the channel sensing mode of the UE 120. As a result, the UE 120 may consume processing resources and/or latency of sidelink communications may be increased (e.g., when the UE 120 is operating in the full channel sensing mode or the on-demand channel sensing mode) or a reliability of sidelink communications may be deceased (e.g., when the UE 120 is operating in the random selection mode).

Some techniques and apparatuses described herein enable channel sensing mode selection for a UE 120. For example, a UE 120 may be enabled to select between a plurality of channel sensing modes for sidelink communications. The UE 120 may identify or select a channel sensing mode based at least in part on one or more QoS parameters of sidelink communications (e.g., a transmission priority, a PDB, and/or a remaining PDB, among other examples). Additionally, or alternatively, the UE 120 may identify or select a channel sensing mode based at least in part on a power constraint associated with the UE 120, such as a battery level of the UE 120, a power draw of the UE 120, and/or a thermal constraint of the UE 120, among other examples.

As a result, the UE 120 may be enabled to change a channel sensing mode in which the UE 120 is operating for sidelink communications. For example, the UE 120 may select a channel sensing mode that decreases latency when sidelink communications transmitted by the UE 120 are delay sensitive. The UE 120 may select a channel sensing mode that increases reliability of sidelink communications when sidelink communications transmitted by the UE 120 are associated with a high reliability requirement or have a high priority. The UE 120 may select a channel sensing mode that consumes less processing resources based at least in part on a power constraint of the UE 120. By enabling the UE 120 to select the channel sensing mode in which the UE 120 operates, the UE 120 may be enabled to adapt the channel sensing mode to QoS parameters of the sidelink communications and/or power constraints of the UE 120, thereby improving performance of the sidelink communications and the UE 120.

As indicated above, FIG. 6 is provided as an example. Other examples may differ from what is described with respect to FIG. 6.

Figure 7:
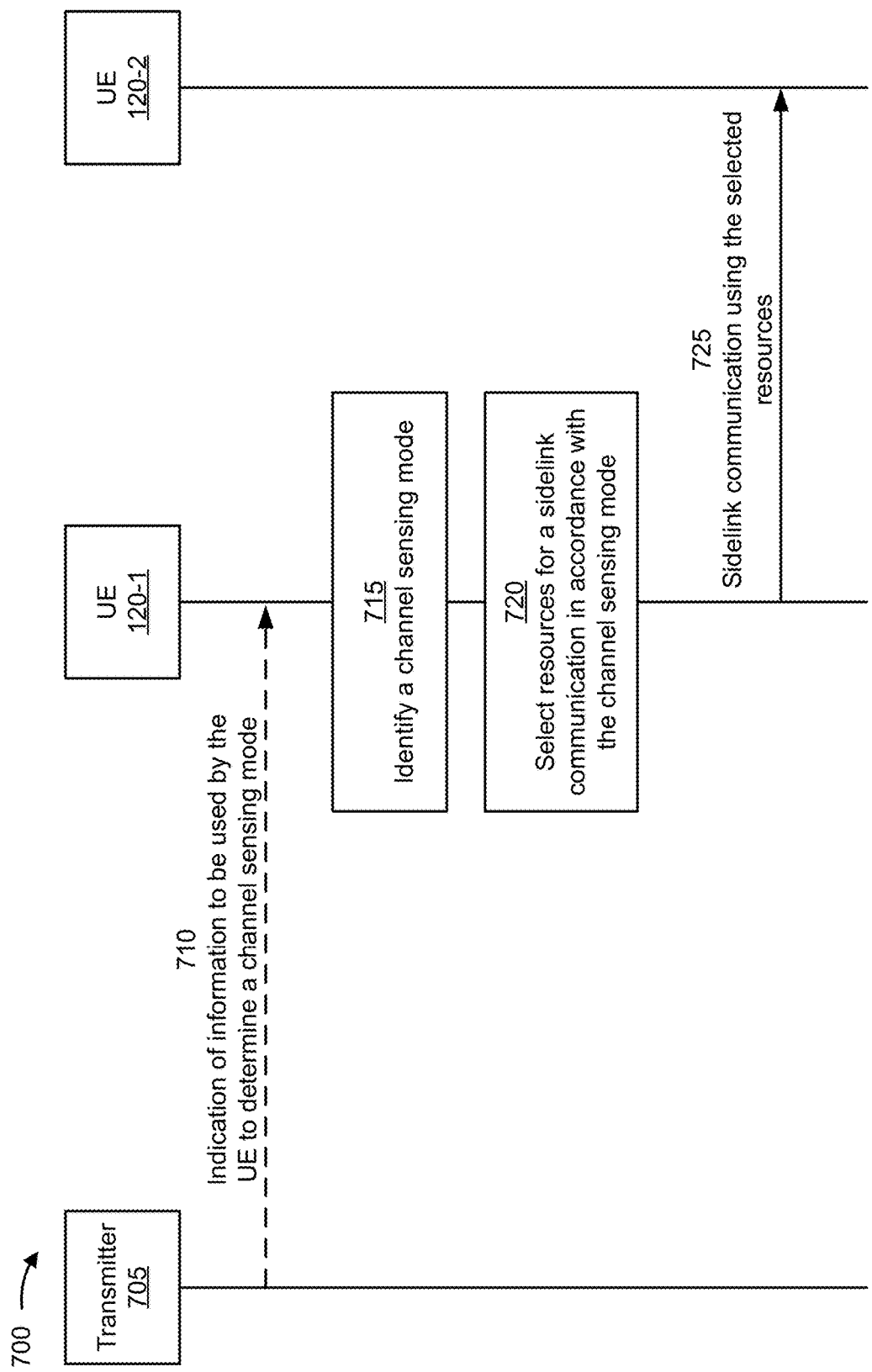
FIG. 7 is a diagram illustrating an example associated with channel sensing mode selection, in accordance with the present disclosure.

FIG. 7 is a diagram illustrating an example 700 associated with channel sensing mode selection, in accordance with the present disclosure. As shown in FIG. 7, a transmitter device 705 and a UE 120-1 may communicate with one another. The transmitter device 705 may be a base station 110, a wireless node (such as an integrated access and backhaul (IAB) node), a UE 120, or a roadside unit (RSU), among other examples. The UE 120-1 and a UE 120-2 may communicate with one another. For example, the UE 120-1 and the UE 120-2 may communicate on a sidelink channel, as described above in connection with FIGS. 3-6.

As shown by reference number 710, the transmitter device 705 may transmit, and the UE 120-1 may receive, information to be used by the UE 120-1 to determine a channel sensing mode to be used by the UE 120-1. For example, the UE 120-1 may be configured with a plurality of channel sensing modes for selecting resources on a sidelink channel, such as the full channel sensing mode, the on-demand channel sensing mode, and/or the random selection mode described above in connection with FIG. 6, among other examples. In some aspects, the transmitter device 705 may transmit a configuration indicating the plurality of channel sensing modes to the UE 120-1. In some aspects, the plurality of channel sensing modes may be configured (or pre-configured) in the UE 120-1. For example, the UE 120-1 may identify one or more channel sensing modes based at least in part on receiving a resource pool configuration (e.g., a configuration transmitted to indicating or defining a resource pool) and/or based at least a pre-configuration stored by the UE 120-1. The pre-configuration may be associated with information or channel sensing modes defined, or otherwise fixed, by a wireless communication standard, such as the 3GPP.

In some aspects, as indicated by the dashed arrow depicted in FIG. 7, the transmitter device 705 may not transmit the indication of the information to be used by the UE 120-1 to determine a channel sensing mode to be used by the UE 120-1. For example, the information to be used by the UE 120-1 to identify or select a channel sensing mode to be used by the UE 120-1 described herein as being indicated by the transmitter device 705 may be identified by the UE 120-1 in a configuration (or pre-configuration) of the UE 120-1 (e.g., without an indication from the transmitter device 705). For example, the information to be used by the UE 120-1 to identify or select a channel sensing mode to be used by the UE 120-1 may be defined, or otherwise fixed, by a wireless communication standard, such as the 3GPP.

In some aspects, the information to be used by the UE 120-1 to identify or select a channel sensing mode to be used by the UE 120-1 may include one or more QoS parameter thresholds (e.g., one or more thresholds associated with one or more parameters that are related to a QoS of communications to be transmitted by the UE 120-1) and/or one or more power constraint parameters. For example, the transmitter device 705 may determine the one or more QoS parameter thresholds. The one or more QoS parameter thresholds may include a first QoS parameter threshold associated with a transmission priority level of communications, a second QoS parameter threshold associated with a packet delay budget value of communications, and/or a third QoS parameter threshold associated with a remaining packet delay budget value of communications, among other examples. The transmitter device 705 may transmit an indication of the one or more QoS parameter thresholds to the UE 120-1. As described above, the UE 120-1 may determine (or identify) the one or more QoS parameter thresholds and/or may determine (or identify) the one or more power constraint parameters without an indication from the transmitter device 705 (e.g., based at least in part on a configuration of the UE 120-1).

In some aspects, the information to be used by the UE 120-1 to identify or select a channel sensing mode to be used by the UE 120-1 may include an indication of whether the UE 120-1 is to be enabled to change a channel sensing mode of the UE 120-1 and/or an indication of one or more permitted channel sensing modes for the UE 120-1. For example, the transmitter device 705 may determine whether the UE 120-1 is to be enabled to change a channel sensing mode of the UE 120-1. If the UE 120-1 is enabled to change a sensing mode of the UE 120-1, the transmitter device 705 may determine one or more permitted channel sensing modes for the UE 120-1. For example, the UE 120-1 may be capable of operating in one or more channel sensing modes and the transmitter device 705 may determine at least one channel sensing mode from the one or more channel sensing modes in which the UE 120-1 is permitted to operate. As described above, in some aspects, the UE 120-1 may determine one or more permitted channel sensing modes for the UE 120-1 and/or may determine whether the UE 120-1 is enabled to change a sensing mode of the UE 120-1 without an indication from the transmitter device 705 (e.g., based at least in part on a configuration of the UE 120-1).

Therefore, the information to be used by the UE 120-1 to identify or select a channel sensing mode to be used by the UE 120-1 may include an indication of one or more parameters, one or more thresholds, and/or one or more permitted channel sensing modes for the UE 120-1. For example, the information to be used by the UE 120-1 to identify or select a channel sensing mode to be used by the UE 120-1 may include an indication of one or more permitted channel sensing modes for the UE 120-1 and an indication of one or more QoS parameter thresholds to be used by the UE 120-1 for selecting a channel sensing mode from the one or more permitted channel sensing modes.

In some aspects, the transmitter device 705 may determine a channel sensing mode in which the UE 120-1 is to operate. In that case, the information to be used by the UE 120-1 to identify or select a channel sensing mode to be used by the UE 120-1 may include an indication of the channel sensing mode in which the UE 120-1 is to operate. Therefore, in some aspects, the UE 120-1 may be enabled to change channel sensing modes in which the UE 120-1 operates based at least in part on an indication from another device (e.g., the transmitter device 705).

As shown by reference number 715, the UE 120-1 may identify or select a channel sensing mode, from one or more channel sensing modes for sensing channel availability of a sidelink channel, for one or more communications on the sidelink channel. As described above, the one or more channel sensing modes may include the full channel sensing mode, the on-demand channel sensing mode, and/or the random selection mode described above in connection with FIG. 6, among other examples. The UE 120-1 may identify or select the channel sensing mode from the one or more channel sensing modes based at least in part on the information to be used by the UE 120-1 to identify or select a channel sensing mode to be used by the UE 120-1, which may be indicated to the UE 120-1 by another device (e.g., the transmitter device 705) or may be identified by the UE 120-1 in a configuration of the UE 120-1.

In some aspects, the UE 120-1 may determine whether the UE 120-1 is enabled to change a channel sensing mode of the UE 120-1. For example, the UE 120-1 may be configured to be enabled to change, or prevented from changing, a channel sensing mode of the UE 120-1. In some aspects, the UE 120-1 may receive an indication of whether the UE 120-1 is enabled to change a channel sensing mode of the UE 120-1 from the transmitter device 705. In some aspects, the UE 120-1 may determine whether the UE 120-1 is enabled to change a channel sensing mode of the UE 120-1 (e.g., based at least in part on a configuration transmitted to the UE 120-1) without receiving an indication from another device.

In some aspects, the UE 120-1 may determine one or more permitted channel sensing modes in which the UE 120-1 is permitted to operate. For example, if the UE 120-1 is enabled to change a channel sensing mode of the UE 120-1, the UE 120-1 may be configured with one or more permitted channel sensing modes. For example, the UE 120-1 may be permitted to operate in the full channel sensing mode and the on-demand channel sensing mode, but not the random selection mode. In some aspects, the UE 120-1 may be permitted to operate in the on-demand channel sensing mode and the random selection mode, but not the full channel sensing mode. In some aspects, the UE 120-1 may be configured with only one permitted channel sensing mode (e.g., indicating that the UE 120-1 is not permitted to change a channel sensing mode of the UE 120-1). In some aspects, the UE 120-1 may receive an indication of the one or more permitted channel sensing modes from the transmitter device 705. In some aspects, the UE 120-1 may determine (or identify) the one or more permitted channel sensing modes (e.g., based at least in part on a configuration transmitted to the UE 120-1) without receiving an indication from another device.

In some aspects, the UE 120-1 may identify or select the channel sensing mode from the one or more channels sensing modes based at least in part on values of one or more parameters related to a QoS of a communication to be transmitted by the UE 120-1. The one or more parameters related to a QoS may include a transmission priority level associated with a communication, a PDB associated with a communication, and/or a remaining PDB associated with a communication, among other examples. The UE 120 may determine the one or more parameters from the QoS associated with a communication and/or may derive one or more parameters from the QoS associated with the communication. For example, the UE 120-1 may determine (or identify) a transmission priority level threshold. The UE 120-1 may determine a transmission priority level associated with a communication. The UE 120-1 may determine whether the transmission priority level associated with a communication satisfies the transmission priority level threshold. In some aspects, if the transmission priority level associated with a communication satisfies the transmission priority level threshold, then the UE 120-1 may identify that the UE 120-1 is to operate in the on-demand channel sensing mode or the full channel sensing mode. If the transmission priority level associated with a communication does not satisfy the transmission priority level threshold, then the UE 120-1 may identify that the UE 120-1 is to operate in the random selection mode.

In some aspects, the UE 120-1 may determine (or identify) a PDB threshold. The UE 120-1 may determine a PDB value associated with a communication. The UE 120-1 may determine whether the PDB value associated with the communication satisfies the PDB threshold. In some aspects, if the UE 120-1 determines that the PDB value associated with the communication satisfies the PDB threshold, then the UE 120-1 may identify that the UE 120-1 is to operate in the on-demand channel sensing mode or the full channel sensing mode. If the UE 120-1 determines that the PDB value associated with the communication does not satisfy the PDB threshold, then the UE 120-1 may identify that the UE 120-1 is to operate in the random selection mode. In some aspects, the PDB threshold may be based at least in part on a size of a sensing window associated with at least one of the channel sensing modes. For example, if the on-demand channel sensing mode is associated with a sensing window of 100 milliseconds, the PDB threshold may be less than or equal to 100 milliseconds.

In some aspects, the UE 120-1 may determine (or identify) a remaining PDB threshold. The UE 120-1 may determine a remaining PDB value associated with a communication. The remaining PDB value may be less than or equal to a PDB value associated with the communication. For example, a PDB value of the communication may begin to run when the UE 120 is triggered to transmit the communication. The UE 120-1 may determine a remaining PDB value of the communication, as the resource selection trigger may occur after the PDB of the communication begins to run in some cases. The UE 120-1 may determine whether the remaining PDB value associated with the communication satisfies the remaining PDB threshold. In some aspects, if the UE 120-1 determines that the remaining PDB value associated with the communication satisfies the remaining PDB threshold, then the UE 120-1 may identify that the UE 120-1 is to operate in the on-demand channel sensing mode or the full channel sensing mode. If the UE 120-1 determines that the remaining PDB value associated with the communication does not satisfy the remaining PDB threshold, then the UE 120-1 may identify that the UE 120-1 is to operate in the random selection mode. In some aspects, the remaining PDB threshold may be based at least in part on a size of a sensing window associated with at least one of the channel sensing modes. For example, if the on-demand channel sensing mode is associated with a sensing window of 100 milliseconds, the remaining PDB threshold may be less than or equal to 100 milliseconds.

In some aspects, the UE 120-1 may determine, identify, and/or obtain the thresholds described above (e.g., one or more transmission priority level thresholds, one or more PDB thresholds, and/or one or more remaining PDB thresholds) from a configuration transmitted to the UE 120-1. In some aspects, the configuration may be transmitted to the UE 120-1 by the transmitter device 705 (or another device). In some aspects, the configuration may be hard-coded in the UE 120-1. In some aspects, the thresholds described above (e.g., one or more transmission priority level thresholds, one or more PDB thresholds, and/or one or more remaining PDB thresholds) may be predefined thresholds. A predefined threshold may be a threshold that is defined, or otherwise fixed, by a wireless communication standard, such as a 3GPP Specification.

In some aspects, the UE 120-1 may identify or select the channel sensing mode from the one or more channels sensing modes based at least in part on one or more power constraint parameters. The one or more power constraint parameters may include a battery level parameter, a power source parameter (e.g., indicating a source of power for the UE 120-1, such as power from a battery power supply, an external power supply, and/or an alternating current (AC) power supply, among other examples), a power draw parameter, and/or a thermal constraint parameter, among other examples. The UE 120-1 may determine a value associated with one or more power constraint parameters. The UE 120-1 may identify or select the channel sensing mode, from the one or more channel sensing modes, based at least in part on the value associated with the one or more power constraint parameters. For example, if the value associated with the one or more power constraint parameters indicates that the UE 120-1 has lower power, has a power supply from an unreliable or limited power source (such as a battery power supply), is experiencing a high power draw, and/or is experiencing high thermal temperatures, then the UE 120-1 may identify that the UE 120-1 is to operate in the random selection mode (e.g., to conserve power and/or reduce a thermal temperature of the UE 120). If the value associated with the one or more power constraint parameters indicates that the UE 120-1 has higher power, has a power supply from a reliable power source (such as an AC power supply), is experiencing a low power draw, and/or is experiencing low thermal temperatures, then the UE 120-1 may identify that the UE 120-1 is to operate in the on-demand channel sensing mode or the full channel sensing mode.

In some aspects, the UE 120-1 may determine the channel sensing mode from the one or more channels sensing modes based at least in part on an indication from another device, such as the transmitter device 705. For example, as described above, the transmitter device 705 may indicate the channel sensing mode to be used by the UE 120-1.

As shown by reference number 720, the UE 120-1 may select resources for a sidelink communication in accordance with the determined channel sensing mode. For example, if the UE 120-1 determines that the UE 120-1 is to operate in the full channel sensing mode, then the UE 120 may perform a channel sensing procedure and may determine a channel availability of a sidelink channel based at least in part on a sensing window that occurs before a resource selection trigger, associated with the sidelink communication, in the time domain (e.g., as described above in connection with FIG. 6). The UE 120-1 may select one or more resources for the sidelink communication from a resource selection window based at least in part on performing the channel sensing procedure.

If the UE 120-1 identifies that the UE 120-1 is to operate in the on-demand channel sensing mode, then the UE 120 may perform a channel sensing procedure and may determine a channel availability of a sidelink channel based at least in part on a sensing window that occurs after a resource selection trigger, associated with the sidelink communication, in the time domain. The UE 120-1 may select one or more resources for the sidelink communication from a resource selection window based at least in part on performing the channel sensing procedure.

If the UE 120-1 identifies that the UE 120-1 is to operate in the random selection mode, then the UE 120 may not perform a channel sensing procedure. The UE 120-1 may select (e.g., randomly) one or more resources for the sidelink communication from a resource selection window.

As shown by reference number 725, the UE 120-1 may transmit the sidelink communication, using the one or more selected resources, to the UE 120-2 on the sidelink channel. As a result, the UE 120-1 may be enabled to change a channel sensing mode in which the UE 120-1 is operating for sidelink communications. For example, the UE 120-1 may select a channel sensing mode that decreases latency when sidelink communications transmitted by the UE 120-1 are delay sensitive. The UE 120-1 may select a channel sensing mode that increases reliability of sidelink communications when sidelink communications transmitted by the UE 120-1 are associated with a high reliability requirement or have a high priority. The UE 120-1 may select a channel sensing mode that consumes less processing resources based at least in part on a power constraint of the UE 120-1. By enabling the UE 120-1 to select a channel sensing mode in which the UE 120 operates, the UE 120-1 may be enabled to adapt the channel sensing mode to QoS parameters of the sidelink communications and/or power constraints of the UE 120-1, thereby improving performance of the sidelink communications and the UE 120-1.

As indicated above, FIG. 7 is provided as an example. Other examples may differ from what is described with respect to FIG. 7.

Figure 8:
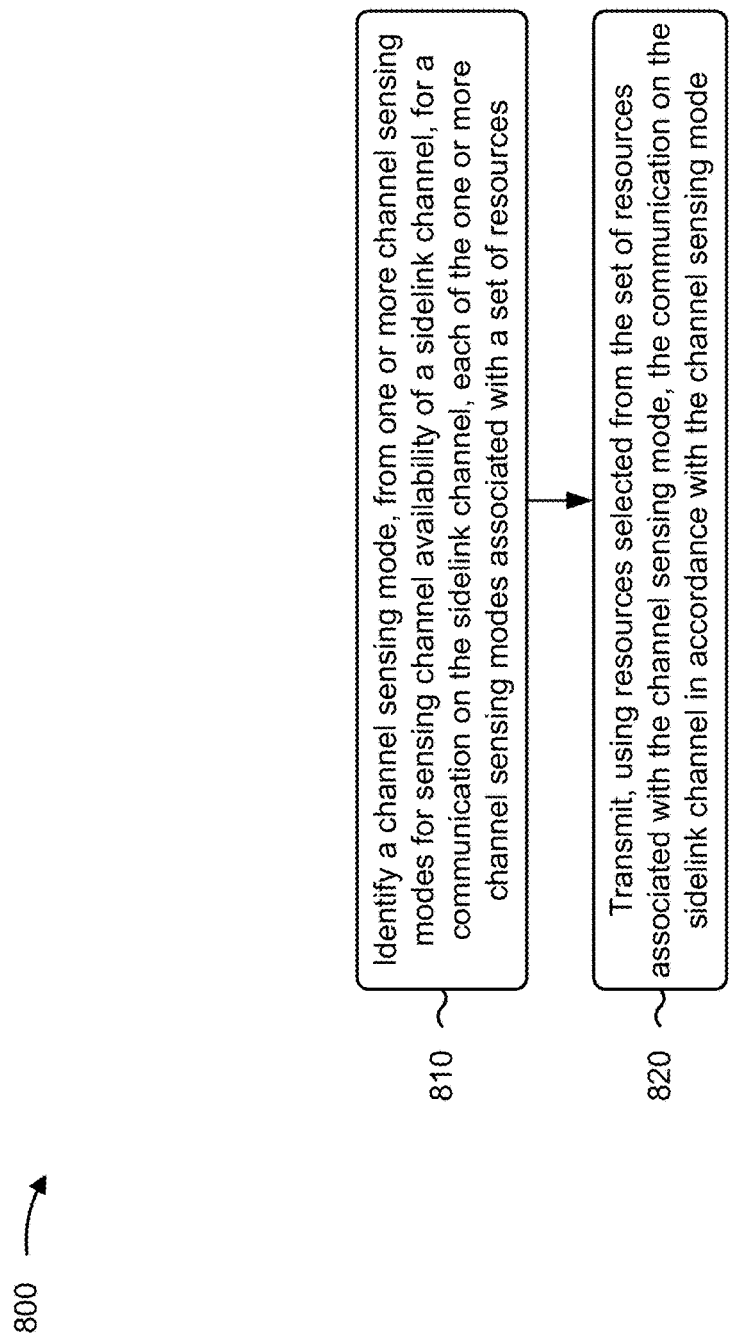
FIGS. 8 and 9 are diagrams illustrating example processes associated with channel sensing mode selection, in accordance with the present disclosure.

FIG. 8 is a diagram illustrating an example process 800 performed, for example, by a UE, in accordance with the present disclosure. Example process 800 is an example where the UE (e.g., UE 120) performs operations associated with channel sensing mode selection.

As shown in FIG. 8, in some aspects, process 800 may include identifying a channel sensing mode, from one or more channel sensing modes for sensing channel availability of a sidelink channel, for a communication on the sidelink channel, each of the one or more channel sensing modes associated with a set of resources (block 810). For example, the UE (e.g., using channel sensing mode identification component 1008, depicted in FIG. 10) may identify a channel sensing mode, from one or more channel sensing modes for sensing channel availability of a sidelink channel, for a communication on the sidelink channel, each of the one or more channel sensing modes associated with a set of resources, as described above.

As further shown in FIG. 8, in some aspects, process 800 may include transmitting, using resources selected from the set of resources associated with the channel sensing mode, the communication on the sidelink channel in accordance with the channel sensing mode (block 820). For example, the UE (e.g., using communication performing component 1010 and/or transmission component 1004, depicted in FIG. 10) may transmit, using resources selected from the set of resources associated with the channel sensing mode, the communication on the sidelink channel in accordance with the channel sensing mode, as described above.

Process 800 may include additional aspects, such as any single aspect or any combination of aspects described below and/or in connection with one or more other processes described elsewhere herein.

In a first aspect, transmitting the communication on the sidelink channel includes selecting resources associated with the sidelink channel for the communication in accordance with the channel sensing mode, and transmitting, using the resources, the communication on the sidelink channel.

In a second aspect, alone or in combination with the first aspect, the one or more channel sensing modes include at least one of: a channel sensing mode associated with a channel sensing window that occurs before a resource selection trigger in a time domain, a channel sensing mode associated with a channel sensing window that occurs after a resource selection trigger in the time domain, a channel sensing mode associated with initiating sensing after a resource selection trigger, or a channel sensing mode that is associated with no channel sensing window.

In a third aspect, alone or in combination with one or more of the first and second aspects, identifying the channel sensing mode, from the one or more channel sensing modes for sensing channel availability of the sidelink channel, for the communication on the sidelink channel includes determining a value of one or more parameters related to a QoS associated with the communication, and identifying the channel sensing mode, from the one or more channel sensing modes, based at least in part on the value of the one or more parameters.

In a fourth aspect, alone or in combination with the third aspect, identifying the channel sensing mode based at least in part on the value of the one or more parameters includes determining at least one of: whether a transmission priority level, associated with the communication, satisfies a first threshold; whether a packet delay budget value, associated with the communication, satisfies a second threshold; or whether a remaining packet delay budget value, associated with the communication, satisfies a third threshold.

In a fifth aspect, alone or in combination with one or more of the first through fourth aspects, identifying the channel sensing mode, from the one or more channel sensing modes for sensing channel availability of the sidelink channel, for the communication on the sidelink channel includes determining a transmission priority level associated with the communication, determining whether the transmission priority level satisfies a threshold, and identifying the channel sensing mode, from the one or more channel sensing modes, based at least in part on the determination of whether the transmission priority level satisfies the threshold.

In a sixth aspect, alone or in combination with the fifth aspect, process 800 includes obtaining, from a configuration, an indication of the threshold, where the threshold is a predefined threshold.

In a seventh aspect, alone or in combination with the fifth aspect, process 800 includes determining the threshold based at least in part on a configuration transmitted to the UE.

In an eighth aspect, alone or in combination with one or more of the first through seventh aspects, identifying the channel sensing mode, from the one or more channel sensing modes for sensing channel availability of the sidelink channel, for the communication on the sidelink channel includes determining a packet delay budget value associated with the communication, determining whether the packet delay budget value satisfies a threshold, and identifying the channel sensing mode, from the one or more channel sensing modes, based at least in part on the determination of whether the packet delay budget value satisfies the threshold.

In a ninth aspect, alone or in combination with the eighth aspect, process 800 includes obtaining, from a configuration, an indication of the threshold, where the threshold is a predefined threshold.

In a tenth aspect, alone or in combination with the eighth aspect, process 800 includes determining the threshold based at least in part on a configuration transmitted to the UE.

In an eleventh aspect, alone or in combination with the eighth aspect, process 800 includes determining a size of a channel sensing window associated with at least one of the one or more channel sensing modes, and determining the threshold based at least in part on the size of the channel sensing window.

In an twelfth aspect, alone or in combination with one or more of the first through eleventh aspects, identifying the channel sensing mode, from the one or more channel sensing modes for sensing channel availability of the sidelink channel, for the communication on the sidelink channel includes determining a remaining packet delay budget value associated with the communication, determining whether the remaining packet delay budget value satisfies a threshold, and identifying the channel sensing mode, from the one or more channel sensing modes, based at least in part on the determination of whether the remaining packet delay budget value satisfies the threshold.

In a thirteenth aspect, alone or in combination with the twelfth aspect, process 800 includes obtaining, from a configuration, an indication of the threshold, where the threshold is a predefined threshold.

In a fourteenth aspect, alone or in combination with the twelfth aspect, process 800 includes determining the threshold based at least in part on a configuration transmitted to the UE.

In a fifteenth aspect, alone or in combination with the twelfth aspect, process 800 includes determining a size of a channel sensing window associated with at least one of the one or more channel sensing modes, and determining the threshold based at least in part on the size of the channel sensing window.

In a sixteenth aspect, alone or in combination with one or more of the first through fifteenth aspects, identifying the channel sensing mode, from the one or more channel sensing modes for sensing channel availability of the sidelink channel, for the communication on the sidelink channel includes receiving, from a transmitter, an indication of the channel sensing mode to be used by the UE, and identifying the channel sensing mode, from the one or more channel sensing modes, based at least in part on the indication of the channel sensing mode to be used by the UE.

In a seventeenth aspect, alone or in combination with one or more of the first through fifteenth aspects, identifying the channel sensing mode, from the one or more channel sensing modes for sensing channel availability of the sidelink channel, for the communication on the sidelink channel includes identifying the channel sensing mode, from the one or more channel sensing modes, based at least in part on a configuration transmitted to the UE.

In an eighteenth aspect, alone or in combination with one or more of the first through seventeenth aspects, identifying the channel sensing mode, from the one or more channel sensing modes for sensing channel availability of the sidelink channel, for the communication on the sidelink channel includes determining a value associated with one or more power constraint parameters, and identifying the channel sensing mode, from the one or more channel sensing modes, based at least in part on the value associated with the one or more power constraint parameters.

In a nineteenth aspect, alone or in combination with the eighteenth aspect, the one or more power constraint parameters include at least one of a battery level parameter, a power source parameter, a power draw parameter, or a thermal constraint parameter.

In a twentieth aspect, alone or in combination with one or more of the first through nineteenth aspects, process 800 includes determining whether the UE is enabled to change the channel sensing mode associated with the UE based at least in part on a configuration transmitted to the UE.

In a twenty-first aspect, alone or in combination with one or more of the first through twentieth aspects, identifying the channel sensing mode, from the one or more channel sensing modes for sensing channel availability of the sidelink channel, for the communication on the sidelink channel includes determining one or more permitted channel sensing modes from the one or more channel sensing modes, and identifying the channel sensing mode, from the one or more permitted channel sensing modes, based at least in part on the determination of the one or more permitted channel sensing modes.

In a twenty-second aspect, alone or in combination with the twenty-first aspect, determining the one or more permitted channel sensing modes from the one or more channel sensing modes includes receiving, from a transmitter, an indication of the one or more permitted channel sensing modes.

In a twenty-third aspect, alone or in combination with the twenty-first aspect, determining the one or more permitted channel sensing modes from the one or more channel sensing modes is based at least in part on a configuration transmitted to the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
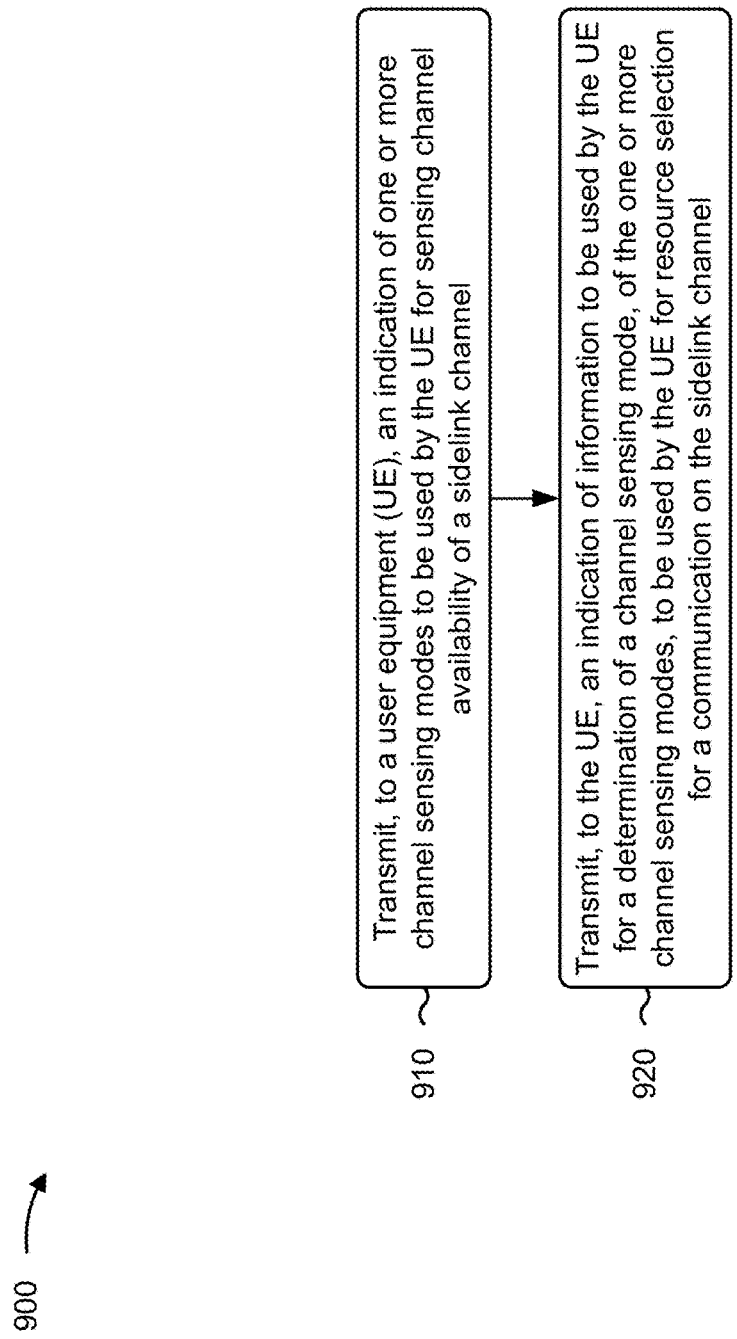

FIG. 9 is a diagram illustrating an example process 900 performed, for example, by a transmitter, in accordance with the present disclosure. Example process 900 is an example where the transmitter (e.g., transmitter device 705, a base station 110, a wireless node, or a UE 120) performs operations associated with channel sensing mode selection.

As shown in FIG. 9, in some aspects, process 900 may include transmitting, to a UE, an indication of one or more channel sensing modes to be used by the UE for sensing channel availability of a sidelink channel (block 910). For example, the transmitter (e.g., using transmission component 1104, depicted in FIG. 11) may transmit, to a UE, an indication of one or more channel sensing modes to be used by the UE for sensing channel availability of a sidelink channel, as described above.

As further shown in FIG. 9, in some aspects, process 900 may include transmitting, to the UE, an indication of information to be used by the UE for a determination of a channel sensing mode, of the one or more channel sensing modes, to be used by the UE for resource selection for a communication on the sidelink channel (block 920). For example, the transmitter (e.g., using transmission component 1104, depicted in FIG. 11) may transmit, to the UE, an indication of information to be used by the UE for a determination of a channel sensing mode, of the one or more channel sensing modes, to be used by the UE for resource selection for a communication on the sidelink channel, as described above.

Process 900 may include additional aspects, such as any single aspect or any combination of aspects described below and/or in connection with one or more other processes described elsewhere herein.

In a first aspect, process 900 includes determining a channel sensing mode, from the one or more channel sensing modes, to be used by the UE, and the indication of the information to be used by the UE includes an indication of the channel sensing mode.

In a second aspect, process 900 includes determining one or more QoS parameter thresholds to be used by the UE for the determination of the channel sensing mode, and the indication of the information to be used by the UE includes an indication of the one or more QoS parameter thresholds.

In a third aspect, alone or in combination with the second aspect, the one or more QoS parameter thresholds include at least one of a first QoS parameter threshold associated with a transmission priority level of communications, a second QoS parameter threshold associated with a packet delay budget value of communications, or a third QoS parameter threshold associated with a remaining packet delay budget value of communications.

In a fourth aspect, alone or in combination with one or more of the first through third aspects, process 900 includes determining whether the UE is to be enabled to change the channel sensing mode of the UE, and the indication of the information to be used by the UE includes an indication of whether the UE is to be enabled to change the channel sensing mode of the UE.

In a fifth aspect, alone or in combination with one or more of the first through fourth aspects, process 900 includes determining one or more permitted channel sensing modes, from the one or more channel sensing modes, to be used by the UE, and the indication of the information to be used by the UE includes an indication of the one or more permitted channel sensing modes.

In a sixth aspect, alone or in combination with one or more of the first through fifth aspects, the one or more channel sensing modes include at least one of a channel sensing mode associated with a channel sensing window that occurs before a resource selection trigger in a time domain, a channel sensing mode associated with a channel sensing window that occurs after a resource selection trigger in the time domain, a channel sensing mode associated with initiating sensing after a resource selection trigger, or a channel sensing mode that is associated with no channel sensing window.

In a seventh aspect, alone or in combination with one or more of the first through sixth aspects, transmitting the indication of the information to be used by the UE for the determination of the channel sensing mode includes transmitting, to the UE, an indication of the channel sensing mode to be used by the UE.

In an eighth aspect, alone or in combination with one or more of the first through sixth aspects, transmitting the indication of the information to be used by the UE for the determination of the channel sensing mode includes transmitting, to the UE, an indication of one or more QoS parameter thresholds to be used by the UE for the determination of the channel sensing mode.

In a ninth aspect, alone or in combination with one or more of the first through eighth aspects, transmitting the indication of the information to be used by the UE for the determination of the channel sensing mode includes transmitting, to the UE, an indication of whether the UE is to be enabled to change the channel sensing mode of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
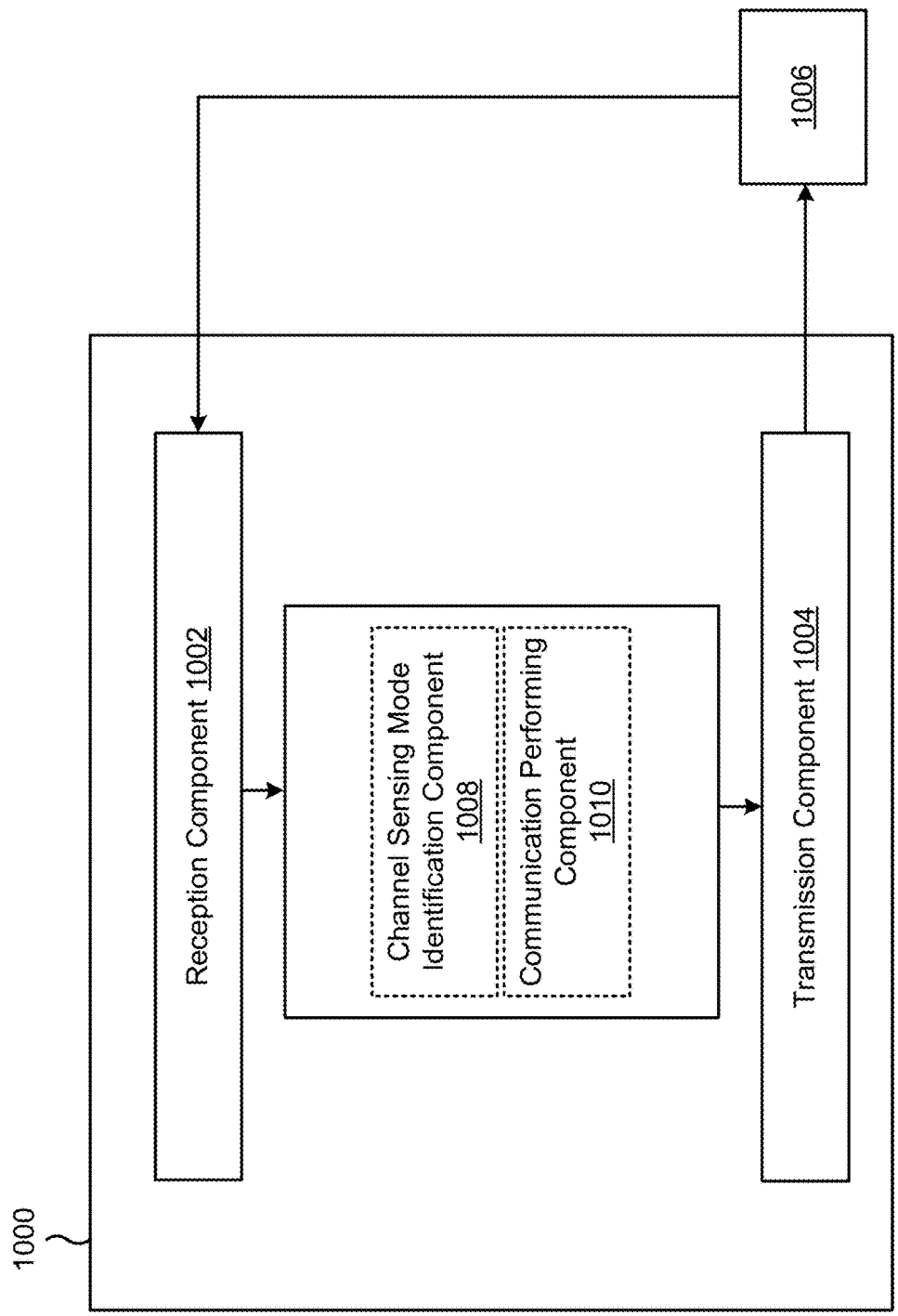
FIGS. 10 and 11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a channel sensing mode identification component 1008, a communication performing component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be collocated with the reception component 1002 in a transceiver.

The channel sensing mode identification component 1008 may identify a channel sensing mode, from one or more channel sensing modes for sensing channel availability of a sidelink channel, for a communication on the sidelink channel, each of the one or more channel sensing modes associated with a set of resources. In some aspects, the channel sensing mode identification component 1008 may include a controller/processor and/or a memory of the UE described in connection with FIG. 2. The communication performing component 1010 and/or the transmission component 1004 may transmit, using resources selected from the set of resources associated with the channel sensing mode, the communication on the sidelink channel in accordance with the channel sensing mode. In some aspects, the communication performing component 1010 may include one or more antennas, a controller/processor, a transmit processor, a transmit MIMO processor, a modulator, and/or a memory of the UE described in connection with FIG. 2.

The communication performing component 1010 may select resources associated with the sidelink channel for the communication in accordance with the channel sensing mode. The communication performing component 1010 and/or the transmission component 1004 may transmit, or may cause the transmission component 1004 to transmit, using the resources, the communication on the sidelink channel.

The channel sensing mode identification component 1008 may determine a value of one or more parameters related to a QoS associated with the communication. The channel sensing mode identification component 1008 may identify the channel sensing mode, from the one or more channel sensing modes, based at least in part on the value of the one or more parameters.

The channel sensing mode identification component 1008 may determine whether a transmission priority level, associated with the communication, satisfies a first threshold. The channel sensing mode identification component 1008 may determine whether a packet delay budget value, associated with the communication, satisfies a second threshold. The channel sensing mode identification component 1008 may determine whether a remaining packet delay budget value, associated with the communication, satisfies a third threshold.

The channel sensing mode identification component 1008 may determine a transmission priority level associated with the communication. The channel sensing mode identification component 1008 may determine whether the transmission priority level satisfies a threshold. The channel sensing mode identification component 1008 may identify the channel sensing mode, from the one or more channel sensing modes, based at least in part on the determination of whether the transmission priority level satisfies the threshold. The reception component 1002 may obtain, from a configuration, an indication of the threshold, where the threshold is a predefined threshold. The channel sensing mode identification component 1008 may determine the threshold based at least in part on a configuration transmitted to the UE.

The channel sensing mode identification component 1008 may determine a packet delay budget value associated with the communication. The channel sensing mode identification component 1008 may determine whether the packet delay budget value satisfies a threshold. The channel sensing mode identification component 1008 may identify the channel sensing mode, from the one or more channel sensing modes, based at least in part on the determination of whether the packet delay budget value satisfies the threshold. The reception component 1002 may obtain, from a configuration, an indication of the threshold, where the threshold is a predefined threshold. The channel sensing mode identification component 1008 may determine the threshold based at least in part on a configuration transmitted to the UE. The channel sensing mode identification component 1008 may determine a size of a channel sensing window associated with at least one of the one or more channel sensing modes. The channel sensing mode identification component 1008 may determine the threshold based at least in part on the size of the channel sensing window.

The channel sensing mode identification component 1008 may determine a remaining packet delay budget value associated with the communication. The channel sensing mode identification component 1008 may determine whether the remaining packet delay budget value satisfies a threshold. The channel sensing mode identification component 1008 may identify the channel sensing mode, from the one or more channel sensing modes, based at least in part on the determination of whether the remaining packet delay budget value satisfies the threshold. The reception component 1002 may obtain, from a configuration, an indication of the threshold, where the threshold is a predefined threshold. The channel sensing mode identification component 1008 may determine the threshold based at least in part on a configuration transmitted to the UE. The channel sensing mode identification component 1008 may determine a size of a channel sensing window associated with at least one of the one or more channel sensing modes. The channel sensing mode identification component 1008 may determine the threshold based at least in part on the size of the channel sensing window.

The reception component 1002 may receive an indication of the channel sensing mode to be used by the UE. The channel sensing mode identification component 1008 may identify the channel sensing mode, from the one or more channel sensing modes, based at least in part on the indication of the channel sensing mode to be used by the UE.

The channel sensing mode identification component 1008 may identify the channel sensing mode, from the one or more channel sensing modes, based at least in part on a configuration transmitted to the UE.

The channel sensing mode identification component 1008 may determine a value associated with one or more power constraint parameters. The channel sensing mode identification component 1008 may identify the channel sensing mode, from the one or more channel sensing modes, based at least in part on the value associated with the one or more power constraint parameters.

The channel sensing mode identification component 1008 may determine whether the UE is enabled to change the channel sensing mode associated with the UE based at least in part on a configuration transmitted to the UE.

The channel sensing mode identification component 1008 may determine one or more permitted channel sensing modes from the one or more channel sensing modes. The channel sensing mode identification component 1008 may identify the channel sensing mode, from the one or more permitted channel sensing modes, based at least in part on the determination of the one or more permitted channel sensing modes. The reception component 1002 may receive an indication of the one or more permitted channel sensing modes. The channel sensing mode identification component 1008 may determine the one or more permitted channel sensing modes from the one or more channel sensing modes is based at least in part on a configuration transmitted to the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
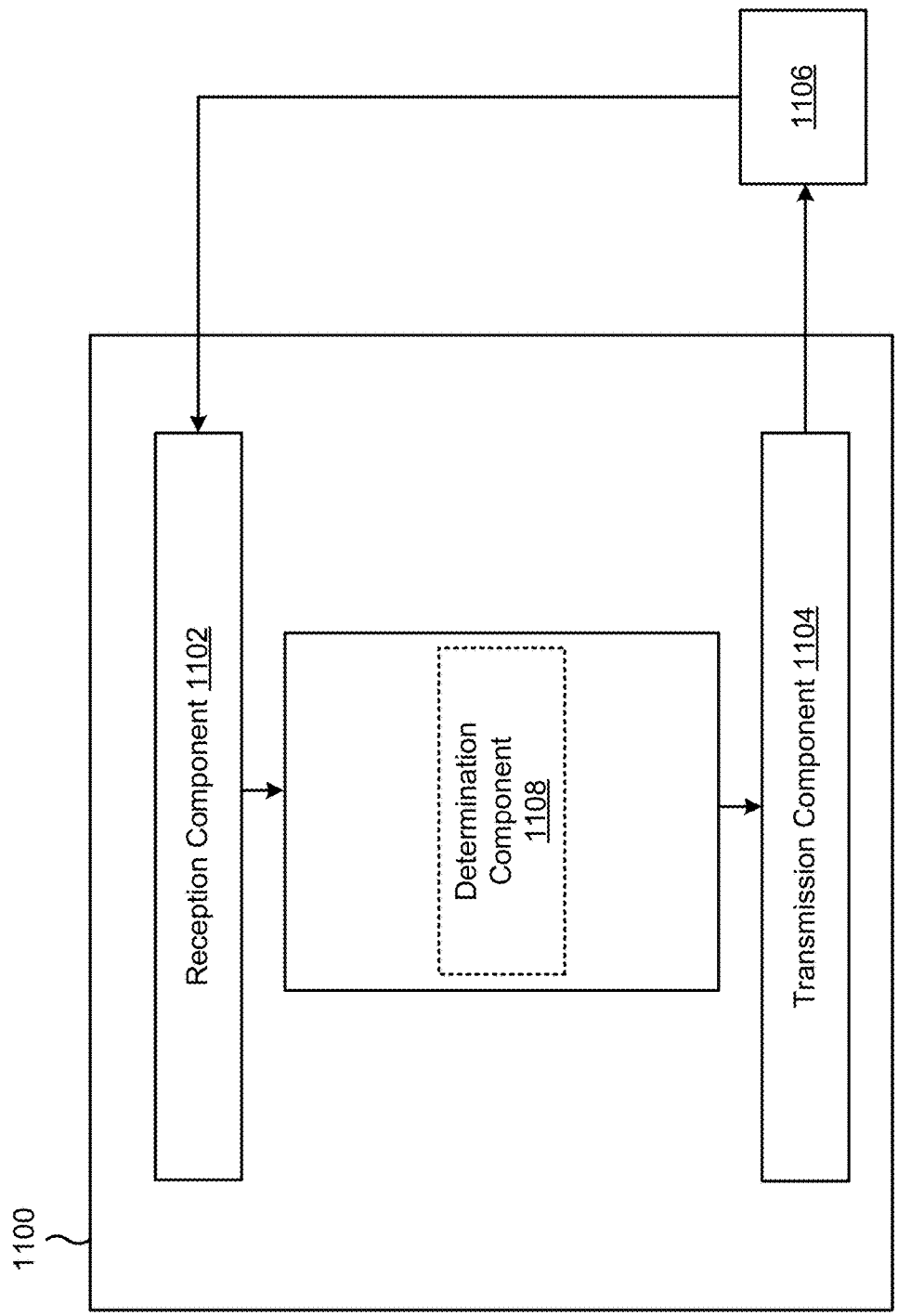

FIG. 11 is a block diagram of an example apparatus 1100 for wireless communication. The apparatus 1100 may be a transmitter device (such as a base station 110, a wireless node, a UE 120, or an RSU), or a transmitter device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the transmitter device described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the transmitter device described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the transmitter device described above in connection with FIG. 2. In some aspects, the transmission component 1104 may be collocated with the reception component 1102 in a transceiver.

The transmission component 1104 may transmit, to a UE, an indication of one or more channel sensing modes to be used by the UE for sensing channel availability of a sidelink channel. The transmission component 1104 may transmit, to the UE, an indication of information to be used by the UE for a determination of a channel sensing mode, of the one or more channel sensing modes, to be used by the UE for resource selection for a communication on the sidelink channel.

The determination component 1108 may determine a channel sensing mode, from the one or more channel sensing modes, to be used by the UE. In some aspects, the determination component 1108 may include a controller/processor or a memory of the transmitter device described in connection with FIG. 2. The transmission component 1104 may transmit, to the UE, an indication of channel sensing mode.

The determination component 1108 may determine one or more QoS parameter thresholds to be used by the UE for the determination of the channel sensing mode. The transmission component 1104 may transmit, to the UE, an indication of the one or more QoS parameter thresholds to be used by the UE for the determination of the channel sensing mode.

The determination component 1108 may determine whether the UE is to be enabled to change the channel sensing mode of the UE. The transmission component 1104 may transmit, to the UE, an indication of whether the UE is to be enabled to change the channel sensing mode of the UE.

The determination component 1108 may determine one or more permitted channel sensing modes, from the one or more channel sensing modes, to be used by the UE. The transmission component 1104 may transmit, to the UE, an indication of the one or more permitted channel sensing modes, from the one or more channel sensing modes, to be used by the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: identifying a channel sensing mode, from one or more channel sensing modes for sensing channel availability of a sidelink channel, for a communication on the sidelink channel, wherein each of the one or more channel sensing modes are associated with a set of resources; and transmitting, using resources selected from the set of resources associated with the channel sensing mode, the communication on the sidelink channel in accordance with the channel sensing mode.

Aspect 2: The method of Aspect 1, wherein transmitting the communication on the sidelink channel comprises: selecting resources associated with the sidelink channel for the communication in accordance with the channel sensing mode; and transmitting, using the resources, the communication on the sidelink channel.

Aspect 3: The method of any of Aspects 1-2, wherein the one or more channel sensing modes include at least one of: a first channel sensing mode associated with a channel sensing window that occurs before a resource selection trigger in a time domain, a second channel sensing mode associated with a channel sensing window that occurs after a resource selection trigger in the time domain, a third channel sensing mode associated with initiating sensing after a resource selection trigger, or a fourth channel sensing mode that is associated with no channel sensing window.

Aspect 4: The method of any of Aspects 1-3, wherein identifying the channel sensing mode, from the one or more channel sensing modes for sensing channel availability of the sidelink channel, for the communication on the sidelink channel comprises: determining a value of one or more parameters related to a quality of service (QoS) associated with the communication; and identifying the channel sensing mode, from the one or more channel sensing modes, based at least in part on the value of the one or more parameters.

Aspect 5: The method of Aspect 4, wherein identifying the channel sensing mode based at least in part on the value of the one or more parameters comprises determining at least one of: whether a transmission priority level, associated with the communication, satisfies a first threshold, whether a packet delay budget value, associated with the communication, satisfies a second threshold, or whether a remaining packet delay budget value, associated with the communication, satisfies a third threshold.

Aspect 6: The method of any of Aspects 1-5, wherein identifying the channel sensing mode, from the one or more channel sensing modes for sensing channel availability of the sidelink channel, for the communication on the sidelink channel comprises: determining a transmission priority level associated with the communication; determining whether the transmission priority level satisfies a threshold; and identifying the channel sensing mode, from the one or more channel sensing modes, based at least in part on the determination of whether the transmission priority level satisfies the threshold.

Aspect 7: The method of Aspect 6, further comprising: obtaining, from a configuration, an indication of the threshold, wherein the threshold is a predefined threshold.

Aspect 8: The method of Aspect 6, further comprising: determining the threshold based at least in part on a configuration transmitted to the UE.

Aspect 9: The method of any of Aspects 1-8, wherein identifying the channel sensing mode, from the one or more channel sensing modes for sensing channel availability of the sidelink channel, for the communication on the sidelink channel comprises: determining a packet delay budget value associated with the communication; determining whether the packet delay budget value satisfies a threshold; and identifying the channel sensing mode, from the one or more channel sensing modes, based at least in part on the determination of whether the packet delay budget value satisfies the threshold.

Aspect 10: The method of Aspect 9, further comprising: obtaining, from a configuration, an indication of the threshold, wherein the threshold is a predefined threshold.

Aspect 11: The method of Aspect 9, further comprising: determining the threshold based at least in part on a configuration transmitted to the UE.

Aspect 12: The method of any of Aspects 9-11, further comprising: determining a size of a channel sensing window associated with at least one of the one or more channel sensing modes; and determining the threshold based at least in part on the size of the channel sensing window.

Aspect 13: The method of any of Aspects 1-12, wherein identifying the channel sensing mode, from the one or more channel sensing modes for sensing channel availability of the sidelink channel, for the communication on the sidelink channel comprises: determining a remaining packet delay budget value associated with the communication; determining whether the remaining packet delay budget value satisfies a threshold; and identifying the channel sensing mode, from the one or more channel sensing modes, based at least in part on the determination of whether the remaining packet delay budget value satisfies the threshold.

Aspect 14: The method of Aspect 13, further comprising: obtaining, from a configuration, an indication of the threshold, wherein the threshold is a predefined threshold.

Aspect 15: The method of Aspect 13, further comprising: determining the threshold based at least in part on a configuration transmitted to the UE.

Aspect 16: The method of any of Aspects 13-15, further comprising: determining a size of a channel sensing window associated with at least one of the one or more channel sensing modes; and determining the threshold based at least in part on the size of the channel sensing window.

Aspect 17: The method of any of Aspects 1-16, wherein identifying the channel sensing mode, from the one or more channel sensing modes for sensing channel availability of the sidelink channel, for the communication on the sidelink channel comprises: receiving, from a transmitter, an indication of the channel sensing mode to be used by the UE; and identifying the channel sensing mode, from the one or more channel sensing modes, based at least in part on the indication of the channel sensing mode to be used by the UE.

Aspect 18: The method of any of Aspects 1-17, wherein identifying the channel sensing mode, from the one or more channel sensing modes for sensing channel availability of the sidelink channel, for the communication on the sidelink channel comprises: identifying the channel sensing mode, from the one or more channel sensing modes, based at least in part on a configuration transmitted to the UE.

Aspect 19: The method of any of Aspects 1-18, wherein identifying the channel sensing mode, from the one or more channel sensing modes for sensing channel availability of the sidelink channel, for the communication on the sidelink channel comprises: identifying the channel sensing mode, from the one or more channel sensing modes, based at least in part on a value associated with one or more power constraint parameters.

Aspect 20: The method of Aspect 19, wherein the one or more power constraint parameters include at least one of: a battery level parameter, a power source parameter, a power draw parameter, or a thermal constraint parameter.

Aspect 21: The method of any of Aspects 1-20, further comprising: determining whether the UE is enabled to change the channel sensing mode associated with the UE based at least in part on a configuration transmitted to the UE.

Aspect 22: The method of any of Aspects 1-21, wherein identifying the channel sensing mode, from the one or more channel sensing modes for sensing channel availability of the sidelink channel, for the communication on the sidelink channel comprises: determining one or more permitted channel sensing modes from the one or more channel sensing modes; and identifying the channel sensing mode, from the one or more permitted channel sensing modes, based at least in part on the determination of the one or more permitted channel sensing modes.

Aspect 23: The method of Aspect 22, wherein determining the one or more permitted channel sensing modes from the one or more channel sensing modes comprises: receiving, from a transmitter, an indication of the one or more permitted channel sensing modes.

Aspect 24: The method of Aspect 22, wherein determining the one or more permitted channel sensing modes from the one or more channel sensing modes is based at least in part on a configuration transmitted to the UE.

Aspect 25: A method of wireless communication performed by a transmitter, comprising: transmitting, to a user equipment (UE), an indication of one or more channel sensing modes to be used by the UE for sensing channel availability of a sidelink channel; and transmitting, to the UE, an indication of information to be used by the UE for a determination of a channel sensing mode, of the one or more channel sensing modes, to be used by the UE for resource selection for a communication on the sidelink channel.

Aspect 26: The method of Aspect 25, further comprising: determining a channel sensing mode, from the one or more channel sensing modes, to be used by the UE; and wherein the indication of the information to be used by the UE includes an indication of the channel sensing mode. wherein the indication of the information to be used by the UE includes an indication of the channel sensing mode.

Aspect 27: The method of any of Aspects 25-26, further comprising: determining one or more quality of service (QoS) parameter thresholds to be used by the UE for the determination of the channel sensing mode; and wherein the indication of the information to be used by the UE includes an indication of the one or more QoS parameter thresholds.

Aspect 28: The method of Aspect 27, wherein the one or more QoS parameter thresholds include at least one of: a first QoS parameter threshold associated with a transmission priority level of communications, a second QoS parameter threshold associated with a packet delay budget value of communications, or a third QoS parameter threshold associated with a remaining packet delay budget value of communications.

Aspect 29: The method of any of Aspects 25-28, further comprising: determining whether the UE is to be enabled to change the channel sensing mode of the UE; and wherein the indication of the information to be used by the UE includes an indication of whether the UE is to be enabled to change the channel sensing mode of the UE.

Aspect 30: The method of any of Aspects 25-29, further comprising: determining one or more permitted channel sensing modes, from the one or more channel sensing modes, to be used by the UE; and wherein the indication of the information to be used by the UE includes an indication of the one or more permitted channel sensing modes.

Aspect 31: The method of any of Aspects 25-30, wherein the one or more channel sensing modes include at least one of: a first channel sensing mode associated with a channel sensing window that occurs before a resource selection trigger in a time domain, a second channel sensing mode associated with a channel sensing window that occurs after a resource selection trigger in the time domain, a third channel sensing mode associated with initiating sensing after a resource selection trigger, or a fourth channel sensing mode that is associated with no channel sensing window.

Aspect 32: The method of any of Aspects 25-31, wherein transmitting the indication of the information to be used by the UE for the determination of the channel sensing mode comprises: transmitting, to the UE, an indication of the channel sensing mode to be used by the UE.

Aspect 33: The method of any of Aspects 25-32, wherein transmitting the indication of the information to be used by the UE for the determination of the channel sensing mode comprises: transmitting, to the UE, an indication of one or more quality of service (QoS) parameter thresholds to be used by the UE for the determination of the channel sensing mode.

Aspect 34: The method of any of Aspects 25-33, wherein transmitting the indication of the information to be used by the UE for the determination of the channel sensing mode comprises: transmitting, to the UE, an indication of whether the UE is to be enabled to change the channel sensing mode of the UE.

Aspect 35: An apparatus for wireless communication at a device, comprising a processor; memory coupled with the processor; and instructions stored in the memory and executable by the processor to cause the apparatus to perform the method of one or more of Aspects 1-24.

Aspect 36: A device for wireless communication, comprising a memory and one or more processors coupled to the memory, the one or more processors configured to perform the method of one or more of Aspects 1-24.

Aspect 37: An apparatus for wireless communication, comprising at least one means for performing the method of one or more of Aspects 1-24.

Aspect 38: A non-transitory computer-readable medium storing code for wireless communication, the code comprising instructions executable by a processor to perform the method of one or more of Aspects 1-24.

Aspect 39: A non-transitory computer-readable medium storing a set of instructions for wireless communication, the set of instructions comprising one or more instructions that, when executed by one or more processors of a device, cause the device to perform the method of one or more of Aspects 1-24.

Aspect 40: An apparatus for wireless communication at a device, comprising a processor; memory coupled with the processor; and instructions stored in the memory and executable by the processor to cause the apparatus to perform the method of one or more of Aspects 25-34.

Aspect 41: A device for wireless communication, comprising a memory and one or more processors coupled to the memory, the one or more processors configured to perform the method of one or more of Aspects 25-34.

Aspect 42: An apparatus for wireless communication, comprising at least one means for performing the method of one or more of Aspects 25-34.

Aspect 43: A non-transitory computer-readable medium storing code for wireless communication, the code comprising instructions executable by a processor to perform the method of one or more of Aspects 25-34.

Aspect 44: A non-transitory computer-readable medium storing a set of instructions for wireless communication, the set of instructions comprising one or more instructions that, when executed by one or more processors of a device, cause the device to perform the method of one or more of Aspects 25-34.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving, from a transmitter, information to be used by the UE to identify a channel sensing mode, from one or more channel sensing modes for sensing channel availability of a sidelink channel, for a communication on the sidelink channel, wherein each of the one or more channel sensing modes are associated with a set of resources; and
    transmitting, based at least in part on an identification of the channel sensing mode and using resources selected from the set of resources associated with the channel sensing mode, the communication on the sidelink channel in accordance with the channel sensing mode, wherein the identification of the channel sensing mode is based at least in part on the received information and a power constraint of the UE.

2. The method of claim 1, wherein transmitting the communication on the sidelink channel comprises:
    selecting resources associated with the sidelink channel for the communication in accordance with the channel sensing mode; and
    transmitting, using the resources, the communication on the sidelink channel.

3. The method of claim 1, wherein the one or more channel sensing modes include at least one of:

a first channel sensing mode associated with a channel sensing window that occurs before a resource selection trigger in a time domain, a second channel sensing mode associated with a channel sensing window that occurs after a resource selection trigger in the time domain, a third channel sensing mode associated with initiating sensing after a resource selection trigger, or a fourth channel sensing mode that is associated with no channel sensing window.

4. The method of claim 1, wherein the identification of the channel sensing mode, from the one or more channel sensing modes for sensing channel availability of the sidelink channel, for the communication on the sidelink channel comprises:

determining a value of one or more parameters related to a quality of service (QOS) associated with the communication; and identifying the channel sensing mode, from the one or more channel sensing modes, based at least in part on the value of the one or more parameters.

5. The method of claim 4, wherein identifying the channel sensing mode based at least in part on the value of the one or more parameters comprises determining at least one of:

whether a transmission priority level, associated with the communication, satisfies a first threshold, whether a packet delay budget value, associated with the communication, satisfies a second threshold, or whether a remaining packet delay budget value, associated with the communication, satisfies a third threshold.

6. The method of claim 1, wherein the identification of the channel sensing mode, from the one or more channel sensing modes for sensing channel availability of the sidelink channel, for the communication on the sidelink channel comprises:

determining a transmission priority level associated with the communication;

determining whether the transmission priority level satisfies a threshold; and identifying the channel sensing mode, from the one or more channel sensing modes, based at least in part on the determination of whether the transmission priority level satisfies the threshold.

7. The method of claim 1, wherein the identification of the channel sensing mode, from the one or more channel sensing modes for sensing channel availability of the sidelink channel, for the communication on the sidelink channel comprises:

determining a packet delay budget value associated with the communication;

determining whether the packet delay budget value satisfies a threshold; and identifying the channel sensing mode, from the one or more channel sensing modes, based at least in part on the determination of whether the packet delay budget value satisfies the threshold.

8. The method of claim 1, wherein the identification of the channel sensing mode, from the one or more channel sensing modes for sensing channel availability of the sidelink channel, for the communication on the sidelink channel comprises:

determining a remaining packet delay budget value associated with the communication;

determining whether the remaining packet delay budget value satisfies a threshold; and identifying the channel sensing mode, from the one or more channel sensing modes, based at least in part on the determination of whether the remaining packet delay budget value satisfies the threshold.

9. The method of claim 1, wherein receiving the information from the transmitter comprises:

receiving, from the transmitter, an indication of the channel sensing mode to be used by the UE, wherein the identification of the channel sensing mode, from the one or more channel sensing modes, is based at least in part on the indication of the channel sensing mode to be used by the UE.

10. The method of claim 1, wherein the identification of the channel sensing mode, from the one or more channel sensing modes for sensing channel availability of the sidelink channel, for the communication on the sidelink channel comprises:

identifying the channel sensing mode, from the one or more channel sensing modes, based at least in part on a configuration in the received information.

11. The method of claim 1, wherein the identification of the channel sensing mode, from the one or more channel sensing modes for sensing channel availability of the sidelink channel, for the communication on the sidelink channel comprises:

identifying the channel sensing mode, from the one or more channel sensing modes, based at least in part on a value associated with one or more parameters corresponding to the power constraint of the UE.

12. The method of claim 1, further comprising:

determining whether the UE is enabled to change the channel sensing mode associated with the UE based at least in part on a configuration in the received information.

13. The method of claim 1, wherein the identification of the channel sensing mode, from the one or more channel sensing modes for sensing channel availability of the sidelink channel, for the communication on the sidelink channel comprises:

determining one or more permitted channel sensing modes from the one or more channel sensing modes; and identifying the channel sensing mode, from the one or more permitted channel sensing modes, based at least in part on the determination of the one or more permitted channel sensing modes.

14. A user equipment (UE) for wireless communication, comprising:

one or more memories; and one or more processors, coupled to the one or more memories, configured to:

receive, from a transmitter, information to be used by the UE to identify a channel sensing mode, from one or more channel sensing modes for sensing channel availability of a sidelink channel, for a communication on the sidelink channel, wherein each of the one or more channel sensing modes are associated with a set of resources; and transmit, based at least in part on an identification of the channel sensing mode and using resources selected from the set of resources associated with the channel sensing mode, the communication on the sidelink channel in accordance with the channel sensing mode, wherein the identification of the channel sensing mode is based at least in part on the received information and a power constraint of the UE.

15. The UE of claim 14, wherein the one or more processors, to transmit the communication on the sidelink channel, are configured to:

select resources associated with the sidelink channel for the communication in accordance with the channel sensing mode; and transmit, using the resources, the communication on the sidelink channel.

16. The UE of claim 14, wherein the one or more channel sensing modes include at least one of:
- a first channel sensing mode associated with a channel sensing window that occurs before a resource selection trigger in a time domain,
- a second channel sensing mode associated with a channel sensing window that occurs after a resource selection trigger in the time domain,
- a third channel sensing mode associated with initiating sensing after a resource selection trigger, or
- a fourth channel sensing mode that is associated with no channel sensing window.

17. The UE of claim 14, wherein the one or more processors, to perform the identification of the channel sensing mode, from the one or more channel sensing modes for sensing channel availability of the sidelink channel, for the communication on the sidelink channel, are configured to:
- determine a value of one or more parameters related to a quality of service (QOS) associated with the communication; and
- identify the channel sensing mode, from the one or more channel sensing modes, based at least in part on the value of the one or more parameters.

18. The UE of claim 17, wherein the one or more processors, to identify the channel sensing mode based at least in part on the value of the one or more parameters, are configured to determine at least one of:
- whether a transmission priority level, associated with the communication, satisfies a first threshold,
- whether a packet delay budget value, associated with the communication, satisfies a second threshold, or
- whether a remaining packet delay budget value, associated with the communication, satisfies a third threshold.

19. The UE of claim 14, wherein the one or more processors, to perform the identification of the channel sensing mode, from the one or more channel sensing modes for sensing channel availability of the sidelink channel, for the communication on the sidelink channel, are configured to:
- determine a transmission priority level associated with the communication;
- determine whether the transmission priority level satisfies a threshold; and
- identify the channel sensing mode, from the one or more channel sensing modes, based at least in part on the determination of whether the transmission priority level satisfies the threshold.

20. The UE of claim 14, wherein the one or more processors, to perform the identification of the channel sensing mode, from the one or more channel sensing modes for sensing channel availability of the sidelink channel, for the communication on the sidelink channel, are configured to:
- determine a packet delay budget value associated with the communication;
- determine whether the packet delay budget value satisfies a threshold; and
- identify the channel sensing mode, from the one or more channel sensing modes, based at least in part on the determination of whether the packet delay budget value satisfies the threshold.

21. The UE of claim 14, wherein the one or more processors, to perform the identification of the channel sensing mode, from the one or more channel sensing modes for sensing channel availability of the sidelink channel, for the communication on the sidelink channel, are configured to:
- determine a remaining packet delay budget value associated with the communication;
- determine whether the remaining packet delay budget value satisfies a threshold; and
- identify the channel sensing mode, from the one or more channel sensing modes, based at least in part on the determination of whether the remaining packet delay budget value satisfies the threshold.

22. The UE of claim 14, wherein the one or more processors, to receive the information from the transmitter, are configured to:
- receive, from the transmitter, an indication of the channel sensing mode to be used by the UE,
- wherein the identification of the channel sensing mode, from the one or more channel sensing modes, is based at least in part on the indication of the channel sensing mode to be used by the UE.

23. The UE of claim 14, wherein the one or more processors, to perform the identification of the channel sensing mode, from the one or more channel sensing modes for sensing channel availability of the sidelink channel, for the communication on the sidelink channel, are configured to:
- identify the channel sensing mode, from the one or more channel sensing modes, based at least in part on a configuration in the received information.

24. The UE of claim 14, wherein the one or more processors, to perform the identification of the channel sensing mode, from the one or more channel sensing modes for sensing channel availability of the sidelink channel, for the communication on the sidelink channel, are configured to:
- identify the channel sensing mode, from the one or more channel sensing modes, based at least in part on a value associated with one or more parameters corresponding to the power constraint of the UE.

25. The UE of claim 14, wherein the one or more processors are further configured to:
- determine whether the UE is enabled to change the channel sensing mode associated with the UE based at least in part on a configuration in the received information.

26. The UE of claim 14, wherein the one or more processors, to perform the identification of the channel sensing mode, from the one or more channel sensing modes for sensing channel availability of the sidelink channel, for the communication on the sidelink channel, are configured to:
- determine one or more permitted channel sensing modes from the one or more channel sensing modes; and
- identify the channel sensing mode, from the one or more permitted channel sensing modes, based at least in part on the determination of the one or more permitted channel sensing modes.

27. A non-transitory computer-readable medium storing a set of instructions for wireless communication, the set of instructions comprising:
- one or more instructions that, when executed by one or more processors of a user equipment (UE), cause the UE to:

receive, from a transmitter, information to be used by the UE to identify a channel sensing mode, from one or more channel sensing modes for sensing channel availability of a sidelink channel, for a communication on the sidelink channel, wherein each of the one or more channel sensing modes are associated with a set of resources; and transmit, based at least in part on an identification of the channel sensing mode and using resources selected from the set of resources associated with the channel sensing mode, the communication on the sidelink channel in accordance with the channel sensing mode, wherein the identification of the channel sensing mode is based at least in part on the received information and a power constraint of the UE.

28. The non-transitory computer-readable medium of claim 27, wherein the one or more instructions, that cause the UE to transmit the communication on the sidelink channel, cause the UE to:

select resources associated with the sidelink channel for the communication in accordance with the channel sensing mode; and transmit, using the resources, the communication on the sidelink channel.

29. An apparatus for wireless communication, comprising:

means for receiving, from a transmitter, information to be used by the apparatus to identify a channel sensing mode, from one or more channel sensing modes for sensing channel availability of a sidelink channel, for a communication on the sidelink channel, wherein each of the one or more channel sensing modes are associated with a set of resources; and means for transmitting, based at least in part on an identification of the channel sensing mode and using resources selected from the set of resources associated with the channel sensing mode, the communication on the sidelink channel in accordance with the channel sensing mode, wherein the identification of the channel sensing mode is based at least in part on the received information and a power constraint of the apparatus.

30. The apparatus of claim 29, wherein the means for transmitting the communication on the sidelink channel comprises:

means for selecting resources associated with the sidelink channel for the communication in accordance with the channel sensing mode; and means for transmitting, using the resources, the communication on the sidelink channel.

* * * * *